(12) United States Patent
Totani et al.

(10) Patent No.: US 7,883,249 B2
(45) Date of Patent: Feb. 8, 2011

(54) LIGHTING DEVICE FOR VEHICLE

(75) Inventors: Chiharu Totani, Aichi-ken (JP);
Akihiro Misawa, Aichi-ken (JP);
Tatsuya Oba, Aichi-ken (JP); Tetsuya Arakawa, Aichi-ken (JP); Shinya Watanabe, Seto (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 221 days.

(21) Appl. No.: 12/000,197

(22) Filed: Dec. 10, 2007

(65) Prior Publication Data

US 2008/0180967 A1    Jul. 31, 2008

(30) Foreign Application Priority Data

Dec. 11, 2006  (JP)  ............................ 2006-333382
Jan. 10, 2007  (JP)  ............................ 2007-001874

(51) Int. Cl.
*F21V 8/00* (2006.01)

(52) U.S. Cl. ....................... 362/511; 362/547; 362/544; 362/540; 362/615

(58) Field of Classification Search ................. 362/511, 362/516, 514, 545, 615–629, 608, 540–542, 362/544, 547
See application file for complete search history.

(56) References Cited

U.S. PATENT DOCUMENTS

| 4,929,866 | A  | * | 5/1990  | Murata et al. | ................ | 313/500 |
| 6,305,825 | B1 | * | 10/2001 | Okubo         | ........................ | 362/294 |
| 6,497,507 | B1 |   | 12/2002 | Weber         |                |         |
| 6,637,923 | B2 |   | 10/2003 | Amano         |                |         |
| 6,945,672 | B2 | * | 9/2005  | Du et al.     | ...................... | 362/241 |
| 7,281,833 | B2 | * | 10/2007 | Akiyama       | .................... | 362/545 |
| 7,329,033 | B2 | * | 2/2008  | Glovatsky et al. | ........... | 362/547 |
| 2007/0195540 | A1 | | 8/2007 | Misawa et al. |                |         |

FOREIGN PATENT DOCUMENTS

JP    1-251502    10/1989

(Continued)

OTHER PUBLICATIONS

Japanese Office Action dated Jun. 22, 2010 with English translation thereof.

*Primary Examiner*—Robert J May
(74) *Attorney, Agent, or Firm*—McGinn IP Law Group, PLLC

(57) ABSTRACT

A lighting device for a vehicle includes: a light source; a light guide member that has a light-introducing part provided in a back surface side through which the light of the light source is introduced and finally emits the light from a front surface side; a part near the light-introducing part being thicker than an edge part of the light guide member, a plurality of reflecting parts and connecting parts being alternately formed continuously toward a direction separate from the light-introducing part in the back surface side, the reflecting parts respectively reflecting on interfaces the introduced light reaching there to form the light in the direction of the front surface of the light guide member; and a housing that is connected to a position between the edge part of the back surface of the light guide member and the light-introducing part and attached to the back surface side of the light guide member to house the light source.

19 Claims, 15 Drawing Sheets

FOREIGN PATENT DOCUMENTS

| | | |
|---|---|---|
| JP | 2001-148203 | 5/2001 |
| JP | 2002-510136 | 4/2002 |
| JP | 2003-5121 | 1/2003 |
| JP | 2003-59312 | 2/2003 |
| JP | 2005-122945 | 5/2005 |
| JP | 2005-123092 | 5/2005 |
| JP | 2006-245084 | 9/2006 |

* cited by examiner

LIGHTING DEVICE FOR VEHICLE

BACKGROUND OF THE INVENTION

1. Field of the Invention

The present invention relates to a lighting device for a vehicle. More particularly, the present invention relates to an improvement of a lighting device for a vehicle such as a rear combination lamp.

2. Description of the Related Art

Usually, in the lighting device for a vehicle such as a rear combination lamp or a high mount stop lamp, the light of a light source is externally emitted through an outer lens (a designed cover) to obtain a desired light emission. For instance, as shown in FIG. 15(a), a lamp 1102 is disposed inside the outer lens 1101 and a reflector 1103 is provided in the periphery of the lamp 1102 (for instance, see JP-A-2005-123092). In such a structure, the light of the lamp 1102 directly advances or advances forward through the reflector 1103 and is emitted outside through the outer lens 1101.

In the above-described usual lighting device, the outer lens 1101 needs to be connected to a housing 1104 in view of a water-proof structure. Ordinarily, in an edge part (a welding margin) 1105, the outer lens is welded to the housing. When the lighting device having such a structure is observed from a front surface (FIG. 15(b)), the edge part (the welding margin) 1105 is whitened to deteriorate design characteristics. Further, when the lighting device is lighted, the edge part as the welding part does not emit light, which results in the deterioration of the design characteristics.

Also, usually, below-described countermeasures are carried out to the heat generation of a lamp unit in a lighting device for a vehicle. For instance, JP-A-2005-122945 discloses a structure that outside air taken in from a space relative to a housing is directly guided to an LED lamp to cool the LED lamp. Further, JP-A-2003-5121 discloses a structure that a natural convection generated due to a temperature difference of air inside and outside a housing is used to naturally ventilate and cool the housing.

A rear combination lamp having a tail/stop lamp formed integrally with a turn lamp has been employed. Ordinarily, the frequency of use of the tail/stop lamp is high. As compared therewith, the frequency of use of the turn lamp is low. Since a quantity of generated heat is different depending on the difference of the frequency of use, a bias is generated in the distribution of the quantity of generated heat in the housing of the rear combination lamp. When a cooling structure that takes such a bias into consideration is provided, the improvement of a cooling efficiency can be anticipated. However, such a cooling structure is not especially studied.

SUMMARY OF THE INVENTION

In order to solve the above-described problems, the present invention has a below-described structure. That is, the present invention provides a lighting device for a vehicle comprising: a light source; a light guide member that has a light-introducing part provided in a back surface side through which the light of the light source is introduced and finally emits the light from a front surface side; a part near the light-introducing part being thicker than an edge part of the light guide member, a plurality of reflecting parts and connecting parts being alternately formed continuously toward a direction separate from the light-introducing part in the back surface side, and the reflecting parts respectively reflecting on interfaces the introduced light reaching there to form the light in the direction of the front surface of the light guide member; and a housing that is connected to a position between the edge part of the back surface of the light guide member and the light-introducing part and attached to the back surface side of the light guide member to house the light source.

In the above-described structure, after the light of the light source is introduced to the light guide member, the light is reflected by the plurality of reflecting parts connected through the connecting parts that are formed in the back surface side of the light guide member. Thus, the light generated thereby is emitted from the front surface of the light guide member. As described above, a light guiding operation of the light guide member and a reflecting operation by the plurality of reflecting parts are used, so that the light extends over to the edge part of the light guide member. Thus, a light emission can be also obtained from the edge part of the front surface of the light guide member.

On the other hand, the housing is connected to the light guide member in a position between the edge part of the back surface of the light guide member and the light-introducing part. Thus, the connecting part of the housing is hardly visually recognized.

As described above, according to the structure of the present invention, the lighting device having high design characteristics can be obtained irrespective of a simple structure.

To achieve the above-described object, the present invention provides a below-described rear combination lamp. That is, the present invention provides a rear combination lamp comprising: a tail/stop lamp part that emits the light of a first lamp; a turn lamp part that emits the light of a second lamp and is provided in the lower part of the tail/stop lamp part; and a housing that houses the first lamp and the second lamp; wherein the tail/stop lamp part communicates with the turn lamp part in the housing, and the housing has a first vent hole in the vicinity of the first lamp and a second vent hole in the vicinity of the second lamp.

In the rear combination lamp of the present invention, the first vent hole functions as an exhaust hole and the second vent hole functions as an air inlet hole. That is, in the housing, a flow of air is generated from the second vent hole to the first vent hole. Thus, the first lamp and the second lamp are cooled. Here, the tail/stop lamp part whose frequency of use is high is arranged in an upper part, so that air heated by the tail/stop lamp part is rapidly discharged to an external part from the first vent hole in the vicinity of the first lamp. Thus, the housing is not filled with heat and is efficiently cooled by outside air. As described above, according to the structure of the present invention, since the frequency of use of the lamp is taken into consideration, an efficient cooling operation is carried out in spite of a simple structure.

BRIEF DESCRIPTION OF THE DRAWINGS

FIG. 15(a) is a sectional view and FIG. 15(b) is a perspective view.

DESCRIPTION OF THE PREFERRED EMBODIMENTS

Figure 1:
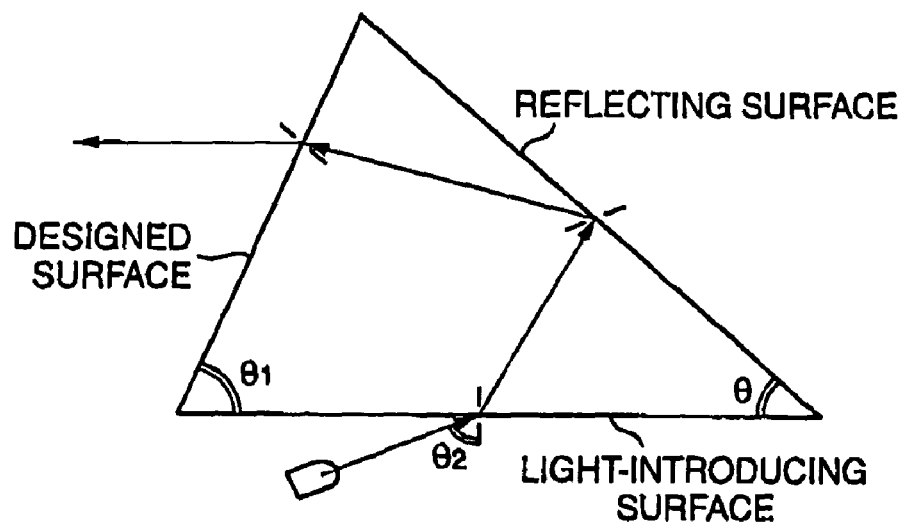
FIG. 1 is a diagram for explaining an angle of a surface forming a reflecting part.

In a lighting device for a vehicle of the present invention, the light of a light source introduced into a light guide member is reflected on a reflecting part in the back surface side of the light guide member to convert the light into a light in the direction of the front surface of the light guide member. Thus, finally, the light is emitted from the front surface of the light guide member. As described above, in the present invention, the front surface of the light guide member serves as a light-emitting surface, that is, an outer surface of the lighting device. Namely, when the lighting device of the present invention is externally viewed, the light-emitting surface of the light guide member is directly observed (not through a cover).

In the back surface side of the light guide member, a light-introducing part is formed. To the light-introducing part, a below-described light source is opposed. The form of the light-introducing part is not especially limited, however, the position, the configuration and the angle of the light-introducing part are set so that an introduced light efficiently reaches a below-described reflecting part. A surface (a light-introducing surface) on which the light of the light source is incident is preferably smoothed in view of a light-introducing efficiency. A plurality of light-introducing parts may be provided. For instance, the same number of light-introducing parts as the number of the light sources to be used are provided. A structure may be formed in which the lights of a plurality of light sources are introduced through one light-introducing part.

The light-introducing part having a recessed form may be provided so as to enclose the light source. Such a light-introducing part is effective to improve the light-introducing efficiency of the light source. Further, the light-introducing part of this form is employed so that the light source (or a part thereof) can be accommodated in the light guide member. Thus, the lighting device can be made to be compact. When the light source that outputs light transversely (as a specific example, a transverse emission type LED lamp) is used, the light-introducing part of this form is ordinarily used.

In the light guide member, a part near the light-introducing part is formed to be thicker than an edge part of the light guide member. For instance, it is assumed that the thickness (a distance between the front surface and the back surface) of the part near the light-introducing part is 2.5 times to 25 times as thick as the thickness of the edge part of the light guide member (a part in which a distance from the outer edge of the light guide member is less than 5% as high as the height of the light guide member is regarded as the edge part). More specifically, the part near the light-introducing part is formed to have the largest thickness and the thickness is set to, for instance, 15 mm to 50 mm, and preferably to 25 mm to 40 mm. On the other hand, the average thickness of the edge part of the light guide member is set to, for instance, 3 mm to 20 mm, and preferably to 5 mm to 10 mm. In such a way, the use of the thick light guide member is effective to prevent the connecting part of the light source or a housing from being externally observed through the light guide member. Further, a good light guiding operation is obtained so that the light is effectively emitted to the edge part of the light guide member.

In the back surface side of the light guide member, a reflecting part is formed in addition to the light-introducing part. For instance, a plurality of reflecting parts that are continuous by interposing connecting parts between them are formed. In this case, the reflecting parts and the connecting parts are alternately formed. The back surface side of the light guide member is formed in the shape of stairs (in other words, a plurality of steps are formed) to obtain the light guide member of this structure.

Preferably, the reflecting parts and the connecting parts are formed from the light-introducing part to the outer edge of the light guide member. That is, the edge of the reflecting part located at an outermost side is formed to come into contact with the outer edge of the light guide member. According to such a structure, even in the edge part of the light guide member, since the light in the direction of the front surface of the light guide member is generated by the function of the reflecting part, the light can be easily emitted from the front surface of the light guide member to an edge (an outer periphery) with an adequate luminance.

To reduce an unevenness in luminance of the light emitted from the front surface of the light guide member, the form of the light guide member is preferably designed so that the distance between the front surface and the back surface of the light guide member is continuously or stepwise decreased as an area is more separated from the light-introducing part. According to this design, in an area separate from the light source, a taking out efficiency of the light is improved, so that a light emission in which a luminance from the front surface side of the light guide member is uniformity is obtained. Specifically, for instance, the back surface of the light guide member may be formed in the shape of the stairs from the light-introducing part toward the outer edge of the light guide member as described above.

The light of the lights introduced from the light-introducing part that reaches the reflecting part is reflected by an interface in the reflecting part and converted into the light in the direction of the front surface of the light guide member. In such a way, the light in the direction of the front surface of the light guide member is generated by the reflecting part formed by using a part of the back surface. The shape or the angle of a surface that specifies each reflecting part can be arbitrarily set in consideration of the advancing direction of a reflected light or the light distributing characteristics of the lighting device. As shown in FIG. 1, assuming that an angle formed by a surface (a reflecting surface) for specifying the reflecting part and a surface (a light-introducing surface) for specifying the light-introducing part is θ, an angle formed by the front surface (a designed surface) of the light guide member and the light-introducing surface is θ1, an incident angle of the light on the light-introducing surface is θ2, and a refractive index of the light guide member is n, a below-described relational equation is established.

$$\theta=[180°-\theta_1-\sin^{-1}\{\sin(90°-\theta_1)/n\}+\sin^{-1}\{(\sin\theta_2)/n\}]/2 \quad \text{[Equation 1]}$$

In accordance with this relational equation, the angle of the surface for specifying each reflecting part can be designed.

The connecting part is an area that cannot positively generate the light in the direction of the front surface differently from the reflecting part. For instance, the connecting part is formed by a surface that is parallel to the advancing direction of the light reaching there. When a reflection is not substantially generated by the connecting part, the light toward an unexpected direction (stray light) can be prevented and the unevenness in luminance can be reduced.

A layer (a reflecting layer) made of a light reflecting material is preferably formed on the surface of the reflecting part. Such a structure is used so that a light reflection factor in the reflecting part can be increased and the luminance (a luminous intensity) of the lighting device is improved. Further, a regular reflection is accelerated in the reflecting part by using a metal material so that the advancing direction of the reflected lights can be adjusted. As described above, the reflecting layer is preferably formed from the viewpoint of light distributing characteristics. The reflecting layer can be formed by, for instance, the deposition of, plating or sputtering the metal material (aluminum, silver, chromium, etc.) or sticking a metal film.

When the lighting device of the present invention is externally observed, the reflecting part formed on the back surface is seen through the front surface of the light guide member. Accordingly, the form of the reflecting part is an important factor to form the design of the lighting device of the present invention. Thus, high design characteristics are given to the reflecting part so that the design characteristics of the lighting device can be improved. For instance, when the reflecting part is formed as described above, a unique texture can be obtained in accordance with a material to be used. Specifically, when the reflecting layer is formed with the metal material such as aluminum, the reflecting part is visually recognized as a texture of metal through the light guide member so that unique design characteristics can be brought out. In place of forming the reflecting layer or in addition to the reflecting layer, when a roughened surface work is carried out or a groove of a prescribed pattern is formed on the surface of the reflecting part, the unique design characteristics can be also given to the reflecting part.

To the back surface side of the light guide member, a housing for accommodating the light source is attached. The housing is connected to a position between the edge part of the back surface of the light guide member and the light-introducing part. In such a way, in the present invention, other part than the edge part is used to connect the housing, so that the connecting part of the housing is hardly visually recognized.

As described above, in the back surface side of the light guide member, the plurality of reflecting parts and the connecting parts are provided. Preferably, the housing is attached to the back surface side of the light guide member by connecting the housing to a part of the connecting parts. As described above, the part that is not directly related to the generation of the reflected light is used for connecting the housing to suppress the deterioration of the luminance and the generation of the unevenness in luminance.

The connecting part (a housing connecting part) to which the housing is connected is preferably protruded in the form of a rib, because the housing can be easily and assuredly connected and a space for accommodating the light source is advantageously ensured. Further, when the rib shaped protruding part is provided to connect the housing to the back surface, an advantage is also obtained that the housing connecting part is hardly visually recognized through the light guide member.

The housing connecting part is preferably set in the vicinity of the light-introducing part. In the part near the light-introducing part, a light guide plate is formed to be thick. According to this structure, the housing connecting part is more hardly seen. Further preferably, the plurality of reflecting parts and the connecting parts provided in the back surface side of the light guide member are designed to be formed in order of the connecting parts and the reflecting parts in the direction separate from the light-introducing part, and the connecting part continuous to the light-introducing part is used to connect the housing. As described above, the housing connecting part is set to the part adjacent to the light-introducing part, so that the housing connecting part is more hardly visually recognized.

The housing is connected by such a welding, sticking. From the reason that the connecting part of the light guide member and the housing is hardly seen and the design characteristics are improved, a welding method is preferably employed.

The number of the light sources to be used can be determined by considering the size of the light guide member or the luminance of an emitted light necessary for the lighting device. A plurality of light sources are ordinarily used. For instance, these light sources are arranged in one row in the longitudinal direction of the light guide member.

The kind of the light source is not especially limited and an LED lamp, a bulb or the like may be used. The LED lamp is most preferably used among them. Since the LED lamp is compact, the lighting device can be made to be compact. Further, the LED lamp has advantages that a quantity of generated heat is low and the influence of the heat to peripheral members can be reduced. Further, the LED lamp has advantages that a driving electric power is low and the lamp has a long life. The kind of the LED lamp is not especially limited and various types of LED lamps such as a cannon ball type, a chip type can be used. However, an LED lamp whose light distribution is controlled by a lens is especially preferable.

The color of the light source can be arbitrarily selected. A plurality of light sources may be used and controlled so that the color of the emitted light can be changed.

Embodiment 1

Figure 2:
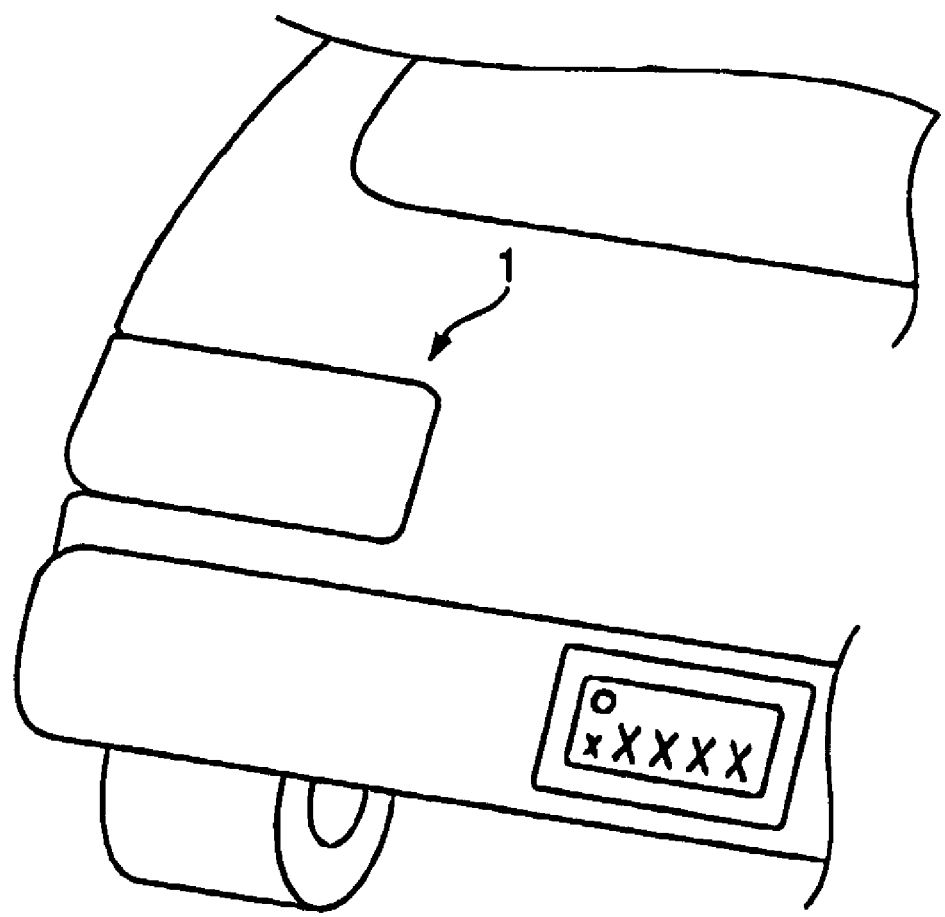
FIG. 2 is a perspective view of a rear part of a motor vehicle on which a rear combination lamp 1 according to an embodiment of the present invention is mounted.
Figure 3:
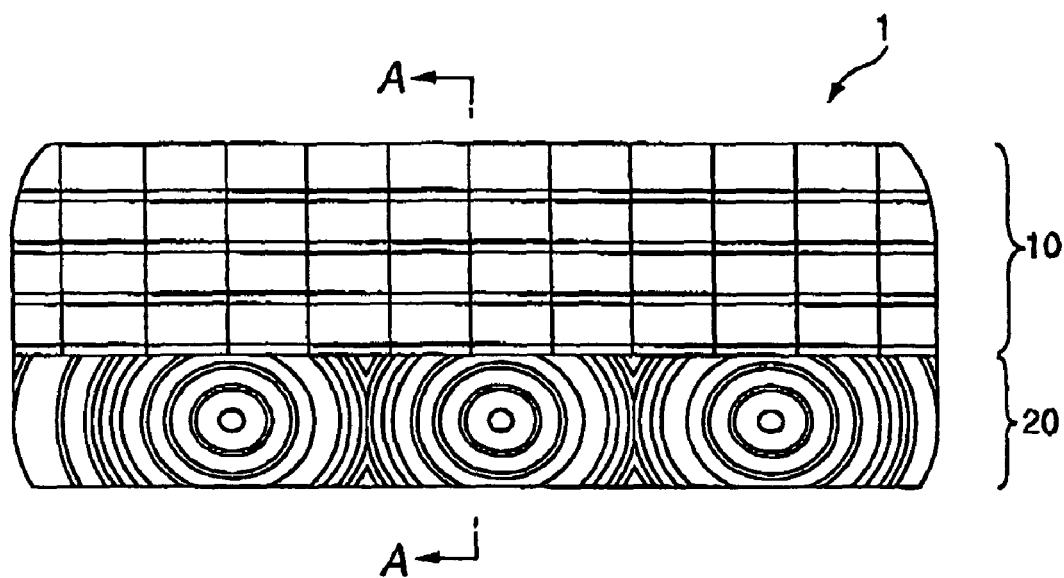
FIG. 3 is a plan view of the rear combination lamp 1.
Figure 4:
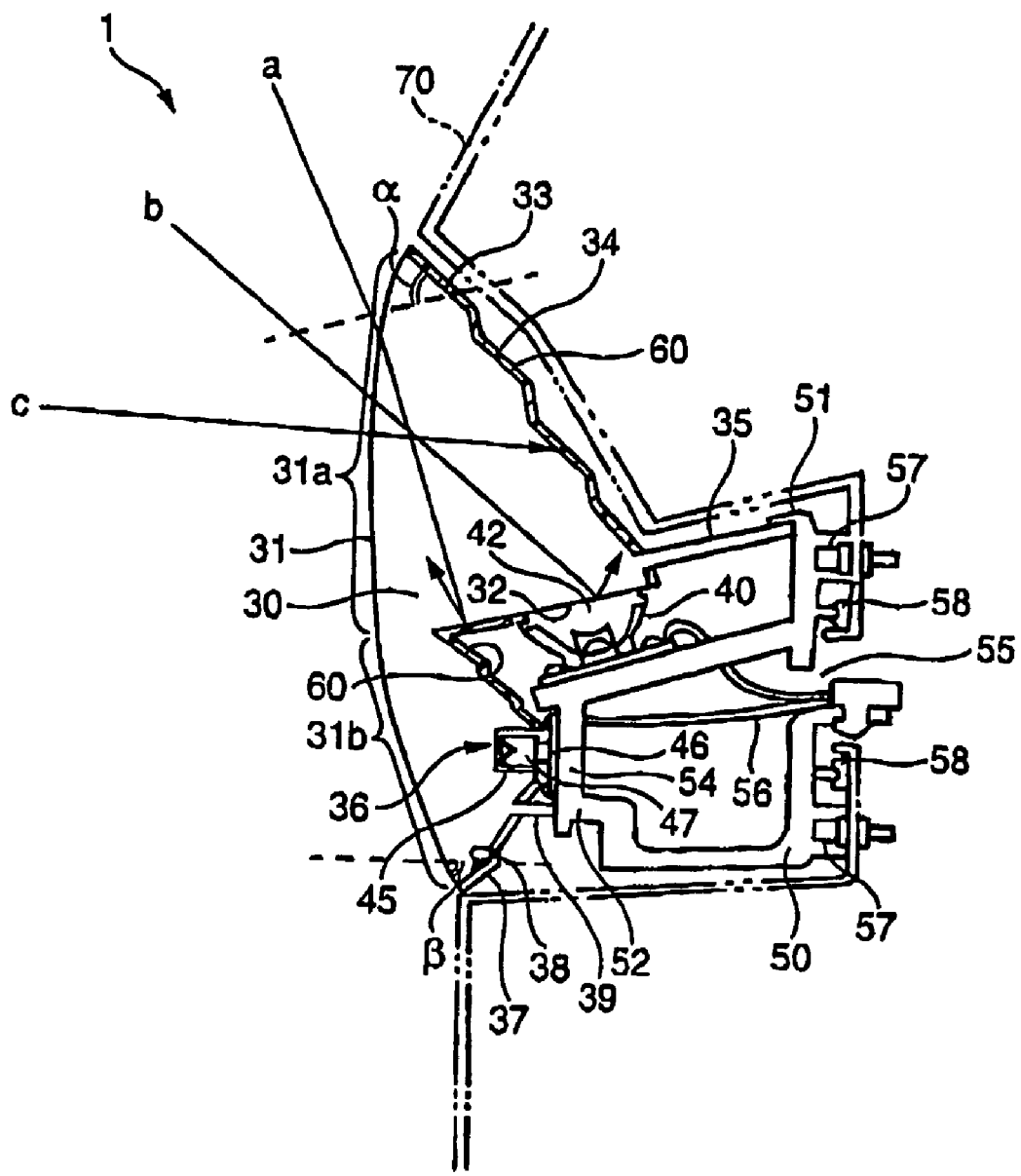
FIG. 4 is a sectional view taken along a line A-A of FIG. 3.

Now, the structure of the present invention will be described in more detail by employing an embodiment 1. FIG. 2 is a perspective view showing a rear part of a motor vehicle provided with a rear combination lamp 1 of the embodiment 1. FIG. 3 is a front view of the rear combination lamp 1. FIG. 4 is a sectional view taken along a line A-A of FIG. 3. The rear combination lamp 1 includes a tail/stop lamp part 10 for carrying out a tail lamp display and a stop lamp display and a turn lamp part 20 for carrying out a turn signal display.

As shown in FIG. 4, the rear combination lamp is roughly classified into and includes a lens 30, two kinds of LED units (a first LED unit 40 and a second LED unit 45) and a housing 50. In the rear combination lamp 1, an outer part is directly irradiated with light emitted from the front surface 31 of the lens 30. That is, the front surface 31 of the lens 30 is a designed surface of the rear combination lamp 1. Thus, a peculiar sense of three dimensions and crystal is obtained.

The lens 30 is made of an acrylic resin whose refractive index is about 1.5. The thickness (a distance between a front surface and a back surface) of the thickest part (a below-described rib shaped protruding part 35 is not considered) of the lens is about 35 mm. As described above, the thick lens is used. The front surface 31 of the lens 30 is a convex surface that is gently curved over an entire part thereof. The radius of curvature of the convex surface is 400 mm to 600 mm. On the other hand, the back surface side of the lens 30 includes, as described below in detail, an upper part forming the tail/stop lamp part 10 and a lower part forming the turn lamp part 20 and the configurations thereof are different.

The material of the lens is not especially limited and a lens made of a light guide material whose refractive index is about 1.4 to 1.8 can be used. Specifically, an acrylic resin, an epoxy resin, glass or the like may be employed as well as a polycarbonate resin used in this embodiment 1.

To the lower surface of the upper part of the lens, the first LED unit 40 is opposed. That is, a part of the lower surface of the upper 26 part of the lens serves as the light-introducing surface (a first light-introducing surface 32) relative to the first LED unit 40. The first light-introducing surface 32 is a smooth surface for improving a light-introducing efficiency. In this embodiment 1, three first LED units 40 are arranged at equal intervals along the longitudinal direction (in FIG. 4, a vertical direction to a sheet surface) of the lens. The first LED unit 40 is an LED unit in which an LED lamp 41 of a red emitted light is incorporated to output parallel lights by the operation of a lens 42 provided above the LED lamp 41.

The back surface side of the upper part of the lens is formed in the shape of regular stairs from a part near the first light-introducing surface 32 to the upper edge of the lens. Thus, first reflecting parts 33 and first connecting parts 34 alternately continue. A part of the lens 30 is used as the reflecting part as described above, so that a simple and compact structure is realized. Even in the edge part of the lens, the first reflecting part 33 is formed.

The first reflecting part 33 is an area for reflecting the light from the first LED unit 40 by an interface to generate a light in the direction of the front surface 31 and is formed with a surface at an angle (α in FIG. 4) of about 40° to about 50° relative to the first light-introducing surface.

The first connecting part 34 is formed with a surface at an angle of about 90° relative to the first light-introducing surface 32 and does not generate a positive reflecting action in the direction of the front surface 31 differently from the first reflecting part 33.

The configuration and the angle of the first reflecting part 33 are set by considering the light distributing characteristics of the tail/stop lamp part 10. The configurations and the angles of all the first reflecting parts 33 are not necessarily the same. The above-described matter is also applied to the first connecting parts 34.

A part of the first connecting part 34 continuous to the first light-introducing surface 32 protrudes rearward in the shape of a rib. A part in which the rib shaped protruding part 35 is formed is the thickest part in the upper part of the lens (see FIG. 4). This rib shaped protruding part 35 is used for connecting a below-described housing 50.

As described above, the back surface side is formed in the shape of stairs. Thus, in the upper part of the lens, the part near the first light-introducing surface 32 is the thickest (about 35 mm). As parts are more separated from the first light-introducing surface 32, the parts are regularly thinner except the part of the rib shaped protruding part 35. The height of the upper part of the lens is about 50 mm.

In the back surface side of the lower part of the lens, a light-introducing part (a second light-introducing part 36) relative to the second LED unit 45 is formed at a central position in the vertical direction. The second light-introducing part 36 is a recessed part to enclose a light output part of the second LED unit 45 therein. The surface of the recessed part forming the second light-introducing part 36 is smooth. Thus, a light-introducing efficiency is improved. In this embodiment 1, three second LED units 45 are arranged at equal intervals along the longitudinal direction (a vertical direction relative to a sheet surface in FIG. 4) of the lens 30. Thus, the second light-introducing parts 36 are also formed at three positions at equal intervals. The second LED unit 45 is an LED unit in which an LED lamp 46 of an emitted light of amber color is incorporated. The second LED unit 45 generates lights in a transverse direction (total direction of 360°) by an operation of a lens 47 provided above the LED lamp 46.

The back side surface of the lower part of the lens is formed in the shape of regular stairs toward a periphery from the second light-introducing part 36 at a center. Thus, second reflecting parts 37 and second connecting parts 38 alternately continue. In the lower edge part of the lens, the second reflecting part 37 is formed. The uppermost second reflecting part 37 is connected to a lower surface (a surface in which the first light-introducing surface 32 is formed). The second reflecting part 37 is an area for reflecting the light from the second LED unit 45 by an interface to generate lights in the direction of the front surface 31 and is formed with a surface at an angle (β in FIG. 4) of about 30° to about 50° with respect to a central axis of the second LED unit 45.

The second connecting part 38 is formed with a surface at an angle of about 90° with respect to the central axis of the second LED unit 45 and does not generate a positive reflecting action in the direction of the front surface 31 differently from the first reflecting part 37.

The configuration and the angle of the second reflecting part 37 are set by considering the light distributing characteristics of the turn signal lamp part 20. The configurations and the angles of all the second reflecting parts 37 are not necessarily the same. The above-described matter is also applied to the second connecting parts 38.

A part of the second connecting part 38 located in the vicinity of the second light-introducing part 36 protrudes rearward in the shape of a rib. This rib shaped protruding part 39 is formed at a thick position in the lower part of the lens. The rib shaped protruding part 39 is used for connecting the below-described housing 50 like the rib shaped protruding part 35 formed in the upper part of the lens.

As described above, the back surface side is formed in the shape of the stairs. Thus, in the lower part of the lens, the part near the second light-introducing part 36 is the thickest (about 30 mm). As parts are more separated from the second light-introducing part 36, the parts are regularly thinner except the part of the rib shaped protruding part 39. The height of the lower part of the lens is about 35 mm.

A light reflecting process is applied to the back surface side of the lens 30 except the first light-introducing surface 32, the second light-introducing part 36 and the rib shaped protruding parts 35 and 39. Specifically, a reflecting layer 60 is formed by the deposition process of the aluminum material. The reflecting layer 60 is formed so that reflection efficiency is improved in the first reflecting parts 33 and the second reflecting parts 37 and the advancing directions of the reflected lights are also uniformed. Further, when the rear combination lamp is viewed from the front surface side of the lens, the reflecting layer 60 is visually recognized to give a texture of metal.

The housing 50 is made of a synthetic resin and includes a connecting part 51 to the rib shaped protruding part 35, a connecting part 52 to the rib shaped protruding part 39, a mounting part 53 of the first LED unit 40 and a mounting part 54 of the second LED unit 45. The connecting part 51 is welded to the end of the rib shaped protruding part 35 and the connecting part 52 is welded to the end of the rib shaped protruding part 39 by heat plates, respectively. Thus, the housing 50 is attached to the back surface side of the lens 30. A wire harness 56 is connected to a base plate for the first LED unit 40 and to a base plate for the second LED unit 45 through a through hole 55 provided in the housing 50. The rear combination lamp 1 is fixed to a motor vehicle body 70 by screws 57 and sheet packing 58.

Now, a lighting operation of the rear combination lamp 1 will be described. Initially, when the tail lamp display is carried out, the first LED unit 40 is lighted with a low luminance in accordance with an input signal from a vehicle side. The parallel lights emitted from the first LED unit 40 are introduced to the upper part of the lens through the first light-introducing surface 32. The introduced lights reach the first reflecting parts 33 to receive a reflecting operation there and are converted into the lights in the direction of the front surface 31. The lights thus generated are emitted from a front surface (in FIG. 4, an area designated by reference numeral 31*a*) in the upper part of the lens. Here, since the thick lens is used, the lights in the direction of the front surface 31*a* are generated by the plurality of first reflecting parts 33 continuing through the first connecting parts 34 and the first reflecting part 33 is provided even in the edge part of the lens, the front surface 31*a* in the upper part of the lens emits the light throughout an entire part including the edge part.

A quantity of light that reaches the first reflecting part 33 located at a position separate from the first LED unit 40 is smaller than a quantity of light that reaches the first reflecting part 33 located at a position near the first LED unit 40. However, as can be understood from the above description, in the first reflecting part 33 located at the position separate from the first LED unit 40, a distance from the front surface 31*a* is short. Thus, the reflected light generated there is efficiently emitted from the front surface 31*a*. In such a way, since the decrease of the quantity of light resulting from the distance from the first LED unit 40 is cancelled by the increase of a light using efficiency, the luminance of the light emitted from the front surface 31*a* is made to be uniform.

Figure 5:
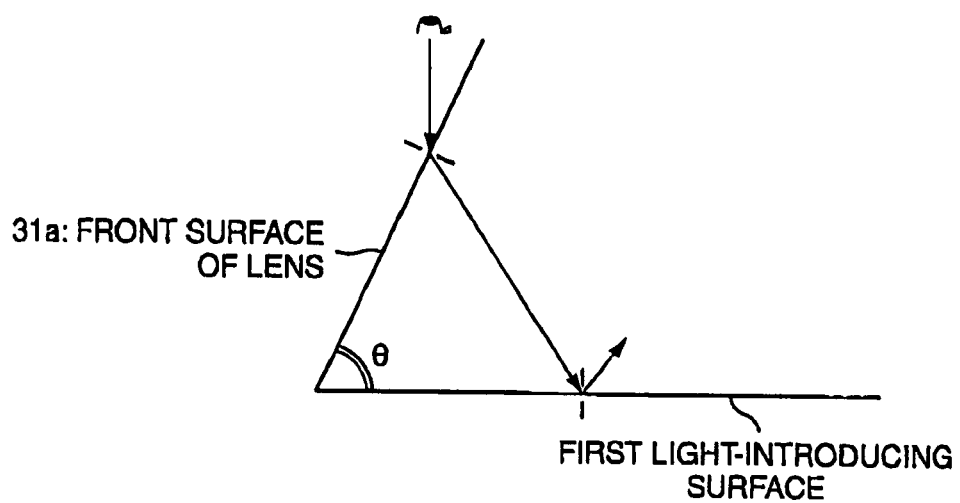
FIG. 5 is a diagram for explaining an angle formed by a front surface 31a of a lens and a first light-introducing surface 32.

On the other hand, in the tail/stop lamp part 10, a very thick lens 30 is used as described above and the first LED unit 40 is not arranged in the back surface side of the upper part of the lens. Then, the lens 30 is designed so that lights of the lights incident from the front surface 31 that directly advance to the first light-introducing surface 32 are totally reflected on an interface of the first light-introducing surface 32 to prevent the first LED lamp 40 from being externally directly observed through the lens 30. Namely, when the lens is observed from a position a or a position b in FIG. 4, the first LED unit 40 is not visually recognized due to the total reflection of the front surface 31*a* of the lens or the first light-introducing surface 32. When the lens is observed from a position c, the reflecting layer 60 is seen, so that the existence of the first LED unit 40 is not recognized as in the case where the lens is observed from the position a or the position b. To generate the total reflection described herein, as shown in FIG. 5, assuming that the refractive index of the lens is n, an angle θ formed by the front surface 31*a* and the first light-introducing surface 32 needs to satisfy a prescribed condition, that is, a below-described relational equation (when a condition is set that the first light-introducing surface 32 is a plane).

$$\theta > 2 \sin^{-1}(1/n) \quad \text{[Equation 2]}$$

In order to easily generate the total reflection, the first light-introducing surface 32 is preferably smoothed. When the first light-introducing surface 32 is smoothed, the lights from the first LED unit 40 can be efficiently taken in the lens 30 and the advancing directions of the taken lights can be set. In such a way, the first light-introducing surface 32 is preferably smoothed in view of a light using efficiency and a light distribution control.

In this embodiment 1, since the first light-introducing surface 32 is a plane, the good distribution of the lights taken in the lens 30 is realized. The configuration of the first light-introducing surface 32 is not limited to the plane, and the first light-introducing surface 32 can be formed by, for instance, an arbitrary curved surface. Further, the first light-introducing surface 32 may be formed by combining surfaces of different configurations.

In the stop lamp display, the same lighting operation as that of the tall lamp display is carried out except that the first LED unit 40 is lighted with a high luminance, and accordingly, a light emission of a high luminance is obtained.

When the turn signal display is carried out, the second LED unit 45 is lighted in accordance with an input signal from the vehicle side to introduce the light of amber color to the lower part of the lens through the second light-introducing part 36 provided in the lower part of the lens. As in the case of the tail lamp display, the introduced light is converted into the light in the direction of a front surface 31*b* by the second reflecting part 37 so that the front surface 31*b* of the lower part of the lens emits light to carry out the turn signal display. Then, as in the tail lamp/stop lamp part 10, since the lights in the direction of the front surface 31*b* are generated by the plurality of reflecting parts 37 continuing to the edge part, the front surface 31*b* in the lower part of the lens emits the lights throughout an entire part including the edge part. Further, the luminance of the lights emitted from the front surface 31*b* of the lens is made to be uniform by the rise of a light using efficiency in an area separate from the second LED unit 45.

As described above, in the combination lamp 1, during each lighting display, the light is emitted throughout the entire part of a part related to the lighting display. Thus, a display excellent in its design characteristics and visibility can be realized.

In the rear combination lamp 1, a welding part to the housing 50 is set not to the outer edge part of the lens 30, but to a position with a large thickness located sufficiently inside the outer edge of the lens 30. Further, since the rib shaped protruding parts 35 and 39 are provided and welded to the housing 50 at their end parts, the welding parts are extremely hardly visually recognized from the front surface side of the lens. Thus, the combination lamp having high design characteristics can be obtained. Further, since the rib shaped protruding parts are used to connect the housing, the housing 50 can be easily and assuredly connected to the lens. In addition thereto, a space for accommodating the light source (the first LED unit 40 and the second LED unit 45) is easily ensured.

Since positions where the rib shaped protruding parts 35 and 39 are provided are set to the connecting parts (the first connecting part 34 and the second connecting part 38) as areas that are not related to the generation of the lights in the direction of the front surface 31 of the lens, the deterioration of the luminance and the generation of an unevenness in luminance are suppressed.

The present invention is employed for the lighting devices for various vehicles (a motor car, a bus, a truck, etc.). Specifically, the present invention can be applied to a rear combination lamp, a tail lamp, a stop lamp, a high mount stop lamp or the like.

Now, components of a rear combination lamp of the present invention will be described in detail. The rear combination lamp includes a tail/stop lamp part and a turn lamp part. The tail/stop lamp part includes a first lamp as a light source. A kind of the first lamp is not especially limited, however, an LED lamp is preferable, because the LED lamp has an advantage that the LED lamp is compact and strong to a vibration and a mechanical shock. A type of the LED lamp is not especially limited and various types such as a cannon ball type, an SMD type, or the like may be used. The first lamp may be formed with a plurality of LED lamps.

On the other hand, the turn lamp part is provided below the tail/stop lamp part. The turn lamp part has a second lamp as a light source. The second lamp is preferably an LED lamp like the first lamp. Further, the second lamp may be formed with a plurality of LED lamps.

A housing houses the first lamp and the second lamp. In the housing, the tail/stop lamp part communicates with the turn lamp part. A material of the housing is not especially limited and can be determined by considering moldability, an impact resistance, a weather resistance, etc. For instance, an ABS resin, a polypropylene (PP) resin or the like may be employed. The housing includes a first vent hole in the vicinity of the first lamp". "The first vent hole is provided in the vicinity of the first lamp" means a state that a center of the first vent hole exists in a circular area of a radius of 10 mm in which a position having the shortest distance between the center of the first lamp and the housing is set as a center, preferably, in a circular area having a radius of 5 mm. The configuration of the first vent hole is not especially limited. A slit form, a circular form, an elliptic form or the like may be employed. The form of the first vent hole may have, for instance a width of 8 mm to 10 mm and a length of 8 mm to 10 mm, preferably, a width of 3 mm to 5 mm and a length of 8 mm to 10 mm. A plurality of holes may be used as the first vent hole. When a plurality of lamps are used for the first lamp, one first vent hole may be provided for one lamp. It is to be understood that one first vent hole may be provided for the plurality of lamps.

The housing has a second vent hole in the vicinity of the second lamp. "The second vent hole is provided in the vicinity of the second lamp" means a state that a center of the second vent hole exists in a circular area of a radius of 15 mm in which a position having the shortest distance between the center of the second lamp and the housing is set as a center, preferably, in a circular area having a radius of 8 mm. The configuration of the second vent hole is not especially limited. A circular form, an elliptic form, a slit form or the like may be employed. For instance, an opening part of the second vent hole may have a circular form of a diameter of 8 mm to 15 mm and, preferably, a circular form of a diameter of 8 mm to 10 mm. When a plurality of lamps are used for the second lamp, one second vent hole may be provided for one lamp. It is to be understood that one second vent hole may be provided for the plurality of lamps.

A water proof process may be applied to the first vent hole and the second vent hole. As the water proof process, a well-known water proof process such as a coating with a gas permeable water proof film or a water repellent mesh may be used. The first vent hole or the second vent hole may be used at the same time as a hole for a harness. In such a way, the hole for the harness may not be separately provided.

Figure 6:
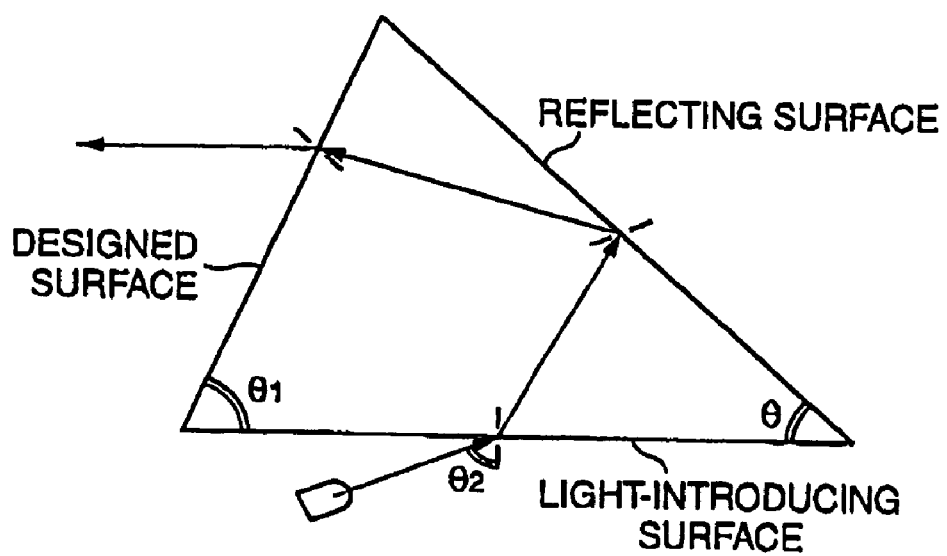
FIG. 6 is a diagram for explaining an angle of a surface forming a reflecting part.

In one embodiment of the present invention, in the tail/stop lamp part, a lens is provided for introducing the light of the first lamp through a first light-introducing part provided in a lower end and emitting the light from a front surface. The thickness of the lens is more decreased continuously or step-wise as the lens is separated more from the lower end. Thus, since in an area separate from the first lamp, a taking out efficiency of the light is improved, so that unevenness in luminance is prevented from being generated in the light emitted from the front surface. Further, in the back surface side of the lens, a plurality of reflecting parts and connecting parts are continuously and alternately formed in the direction separate from the lower end. Here, the reflecting parts reflect the introduced lights reaching there on their interfaces to generate lights in the direction of the front surface of the lens. In this structure, the light of the first lamp is introduced to the lens, and then, reflected by the plurality of reflecting parts continuing through the connecting parts. Thus, the generated light is emitted from the front surface of the lens. In such a way, since a light-introducing operation of the lens and a reflecting operation by the plurality of reflecting parts are used, the light spreads to the edge part of the lens. Accordingly, a light emission can be obtained from the edge part of the ions. The reflecting parts on the back surface of the lens are formed by applying a light reflecting process to the back surface of the lens. As the light reflecting process, for instance, the deposition, plating or sputtering process of a metal material (aluminum, silver, chromium, etc.) or a sticking process of a metal film may be used. Otherwise, a roughened surface work may be carried out or a groove of a prescribed pattern may be formed According to an embodiment of the present invention, when the rear combination lamp is externally observed, the front surface (a light-emitting surface) of the lens is directly seen (without providing a cover). Further, the reflecting parts formed on the back surface are seen through the front surface of the lens. Accordingly, the reflecting parts constitute an important factor to form the design of the rear combination lamp of the present invention. Thus, high design characteristics are given to the reflecting parts so that the design characteristics of the rear combination lamp can be improved. For instance, recessed parts are continuously formed with a prescribed pattern in the back surface of the lens. When the light reflecting process as described above is applied to such a back surface, reflecting parts having the continuous recessed parts are formed. In such a way, since the configuration of a light reflecting part depends on the configuration of the back surface of the lens, the reflecting part of a desired configuration can be easily formed. As shown in FIG. 6, assuming that an angle formed by a surface (a reflecting surface) for specifying the reflecting part and a surface (a light-introducing surface) for specifying the light-introducing part is θ, an angle formed by the front surface (a designed surface) of a light guide member and the light-introducing surface is θ 1, an introducing angle of the light on the light-introducing surface is θ 2, and a refractive index of the light guide member is n, a below-described relational equation is established.

$$\theta = [180° - \theta_1 - \sin^{-1}\{\sin(90° - \theta_1)/n\} + \sin^{-1}\{(\sin \theta_2)/n\}]/2 \qquad \text{[Equation 3]}$$

In accordance with this relational equation, the angle of the surface for specifying each reflecting part can be designed.

In the lens, the thickness of the lower end as the light-introducing part ranges, for instance, from 15 mm to 50 mm, preferably, from 25 to 40 mm. When the thickness is too small, there is a fear that a light-introducing efficiency is deteriorated or an influence to a light-introducing operation is generated. However, when the thickness is too large, the thickness of the lens is increased to a desired level or higher to cause a weight or a production cost to be increased. On the other hand, the thickness of an upper end (an opposite side to the lower end) ranges, for instance, from 3 mm to 20 mm, preferably, from 5 mm to 10 mm.

The use of the thick lens is effective to prevent the first lamp from being externally observed through the lens. Further, since the thickness of the lens is large, when the lens is observed from the front surface side, a unique sense of three dimensions and crystal is given to an observer with excellent design characteristic.

In the lens having the large thickness, the form of the lens is more liable to change by an expansion/contraction resulting from a temperature change than the lens having the small thickness. When the form of the lens changes, there is a possibility that the reflecting parts formed on the back surface side of the lens are caused to be peeled off. However, in the rear combination lamp of the present invention, since the entire part of the device is efficiently cooled, the thermal expansion/contraction of the lens is suppressed to prevent the reflecting parts from being peeled off.

The first lamp is preferably provided with a heat sink having rib shaped fins in the back surface side. In this case, the first lamp is preferably arranged so that the light-emitting side of the first lamp is opposed to the lower surface of the lens and is preferably formed so that the fins of the heat sink are parallel to the forward and backward direction of the lens. In such a way, since air heated by the first lamp is apt to move rearward in an area where the first lamp is disposed and the air is smoothly exhausted from the first vent hole, a cooling effect of the entire part of the device is improved.

On the other hand, when the first lamp is arranged on the back surface side of the lens so that the light-emitting side thereof is opposed to the back surface side of the lens, the first vent hole of the housing is preferably provided in the vicinity of the first lamp and in an upper part of the first lamp and the fins of the heat sink are preferably parallel to a upward and downward direction of the lens. In such a way, the fins of the heat sink serve as a guide for supplying outside air entering from the second vent hole toward the first vent hole located in the upper part. Thus, the air is smoothly exhausted from the first vent hole to an external part, so that the cooling effect of the entire part of the device is improved.

A light scattering agent may be included in the lens. Thus, the diffusion of the light is accelerated in the lens to emit the light with a good luminance balance from the front surface of the lens. As the light scattering agent, for instance, glass having a prescribed particle diameter, metal such as aluminum, a resin having a refractive index of light different from that of the lens, silica, etc. may be employed.

Now, embodiments of the present invention will be described below.

Embodiment 2

Figure 7:
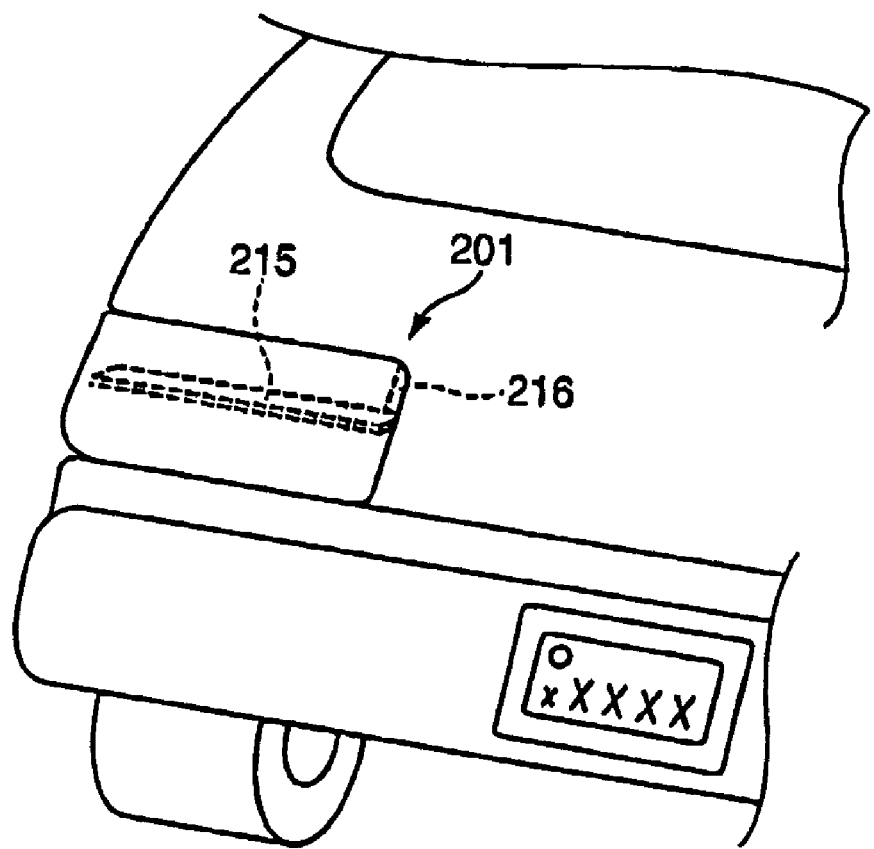
FIG. 7 is a perspective view of a rear part of a motor vehicle having a rear combination lamp 201 according to an embodiment of the present invention.
Figure 8:
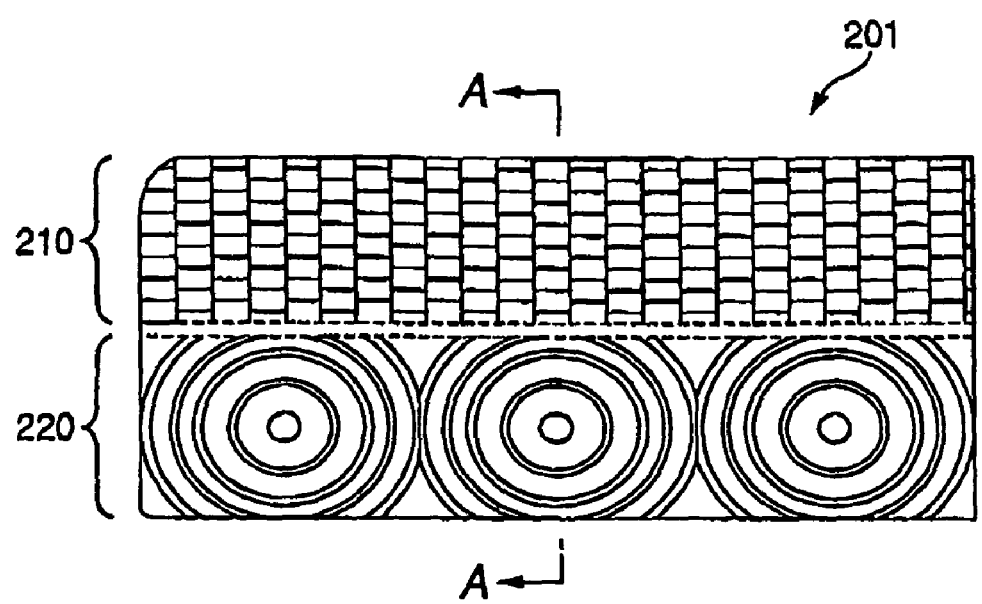
FIG. 8 is a plan view of the rear combination lamp 201.
Figure 9:
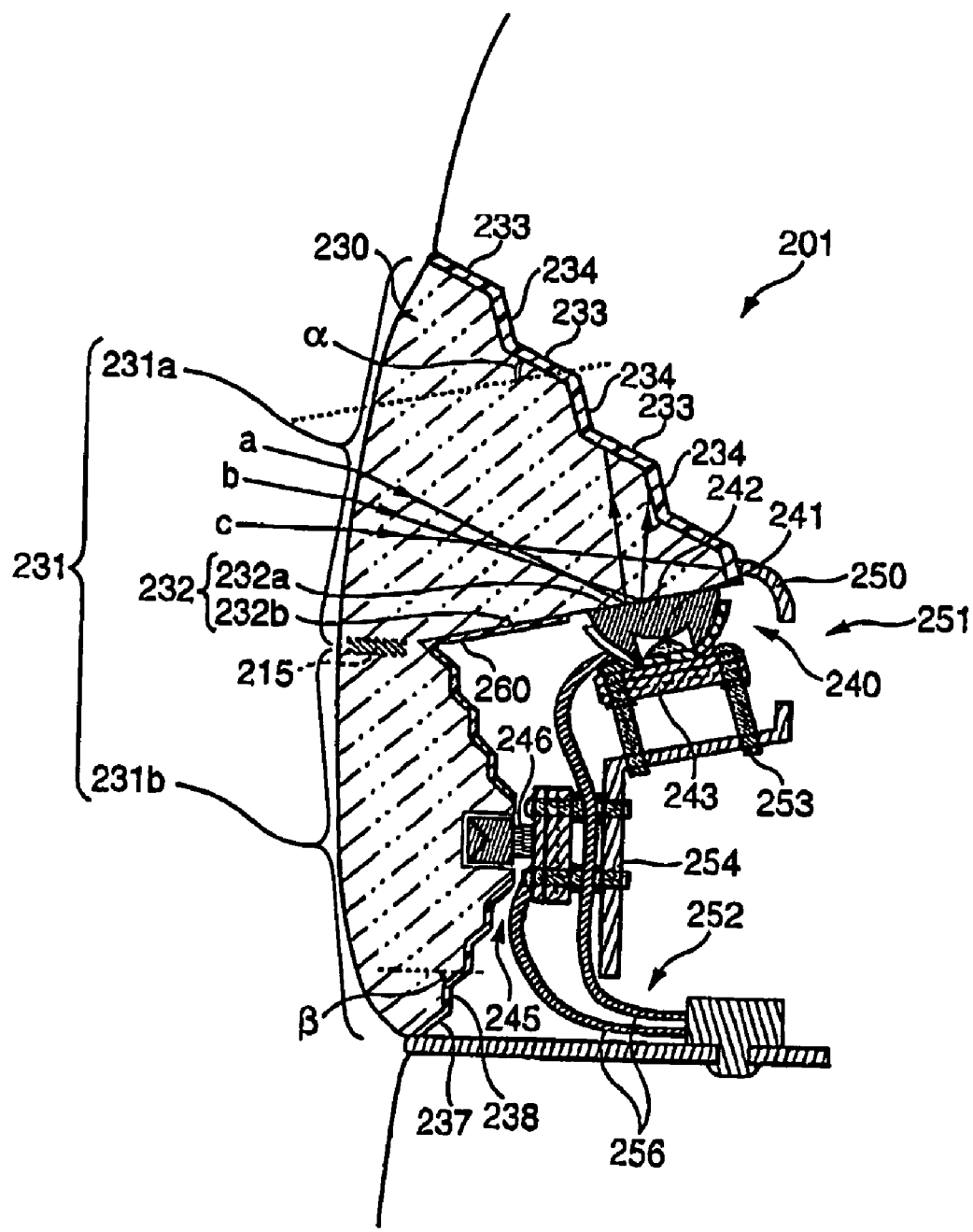
FIG. 9 is a sectional view taken along a line A-A of FIG. 8.

FIG. 7 is a perspective view showing a rear part of a motor vehicle provided with a rear combination lamp 201 of an embodiment 2 of the present invention. FIG. 8 is a front view of the rear combination lamp 201. FIG. 9 is a sectional view taken along a line A-A of FIG. 8. The rear combination lamp 201 includes a tail/stop lamp part 210 for carrying out a tail lamp display and a stop lamp display and a turn lamp part 220 for carrying out a turn signal display.

As shown in FIG. 9, the rear combination lamp 201 is roughly classified into and includes a lens 230, two kinds of LED units (a first lamp 240 and a second lamp 245) and a housing 250. In the rear combination lamp 201, an outer part is directly irradiated with light emitted from the front surface 231 of the lens 230. That is, the front surface 231 of the lens 230 is a designed surface of the rear combination lamp 201. Thus, a peculiar sense of three dimensions and crystal is obtained.

The housing 250 is made of a synthetic resin and includes a first vent hole 251, a second vent hole 252, a mounting part 253 of the first lamp 240 and a mounting part 254 of the second lamp 245. The housing 250 is attached to the back surface of the lens 230 by welding the edge part of the housing 250 to the edge part of the back surface side of the lens 230 through a hot plate. Thus, under a state that areas where the first lamp 240 and the second lamp 245 are disposed communicate with each other, the first lamp 240 and the second lamp 245 are housed between the lens 230 and the housing 250. The first vent hole 251 is provided at a rear position of the area where the first lamp 240 is disposed. The form of the first vent hole 251 is a slit type having a width of 3 mm and a length of 8 mm. The first vent hole is formed over the area where the three first lamps 240 are disposed. In the vicinity of the second lamp 245 in the housing 250, the second vent hole 252 is provided. A wire harness 256 is connected to a base plate for the first lamp 240 and a base plate for the second lamp 245 through the second vent hole 252.

The first lamp 240 is provided with a heat sink 243 having rib shaped fins. The heat sink 243 is made of aluminum and attached to the back surface side of the first lamp 240. The fins of the heat sink 243 are formed so as to be parallel to the forward and backward direction (a transverse direction of a sheet surface in FIG. 9) of the lens 230.

The lens 230 is made of an acrylic resin whose refractive index is about 1.5. The thickness (a distance between a front surface and a back surface) of the thickest part is about 35 mm. As described above, an upper part of the lens 230 functions as the lens of the tail/stop lamp part 210 and a lower part functions as the lens of the turn lamp part 220. That is, the lens 230 has two kinds of lenses formed integrally. The front surface 231 of the lens 230 is a convex surface that is gently curved over an entire part thereof. The radius of curvature of the convex surface is 400 mm to 600 mm. On the other hand, in the back surface side of the lens 230, as described below in detail, configurations are different between the upper part and the lower part.

The material of the lens is not especially limited and a lens made of a light guide material whose refractive index is about 1.4 to 1.8 can be used. Specifically, a polycarbonate resin, an epoxy resin, glass or the like may be employed as well as an acrylic resin used in this embodiment.

As shown in FIG. 9, a lower surface 232 of the upper part of the lens 230 is divided into a first light-introducing part 232a located in the back surface side and a non-light-introducing part 232b located in the front surface side by regarding a substantially central part thereof as a boundary. To the first light-introducing part 232a, the first lamp 240 is opposed. In such a way, the first light-introducing part 232a is separated form the front surface 231, so that the thickness of the lens 230 can be suitably adjusted. Namely, a degree of freedom in designing the lens 230 is improved. The first light-introducing part 232a is formed to be a smoothed surface to increase a light-introducing efficiency. In this embodiment, three first lamps 240 are arranged at equal intervals along the longitudinal direction (a vertical direction to a sheet surface in FIG. 9). The first lamp 240 is an LED unit in which an LED lamp 241 with a light emission of red color is incorporated to output parallel lights in accordance with an operation of a lens 242 provided above the LED lamp 241.

The back surface side of the upper part of the lens 230 is formed in the shape of regular stairs from a part near the first light-introducing part 232a to an upper part. Thus, first reflecting parts 233 and first connecting parts 234 alternately continue. A part of the lens 230 is used as the reflecting part as described above, so that a simple and compact structure is realized.

The first reflecting part 233 is an area for reflecting the light from the first lamp 240 by an interface to generate a light in the direction of the front surface 231 and forms a convex curved surface (a reflecting surface) inclined at a prescribed angle relative to the first light-introducing part 232a. In a section, an angle formed by the convex curved surface and the first light-introducing part 232a ($\alpha$ in FIG. 4) is about 40° to about 50°.

The surface of the first connecting part 234 is substantially vertical to the first light-introducing part 232a in its section and does not generate a positive reflecting action in the direction of the front surface 231 differently from the first reflecting part 233.

The configuration and the angle of the first reflecting part 233 are set by considering the light distributing characteristics of the tail/stop lamp part 210. All the first reflecting parts 233 are arranged so as to be irradiated with the light from the first lamp 240. The configurations and the angles of all the first reflecting parts 233 are not necessarily the same. The above-described matter is also applied to the first connecting parts 234.

As described above, the back surface side is formed in the shape of stairs. Thus, in the upper part of the lens 230, the part near the first light-introducing part 232a is the thickest (about 35 mm). As parts are more separated from the first light-introducing part 232a, the parts are regularly thinner. The height of the upper part of the lens 230 is about 50 mm.

In the back surface side of the lower part of the lens 230, a light-introducing part (a second light-introducing part 236) relative to the second lamp 245 is formed at a central position in the vertical direction. The second light-introducing part 236 is a recessed part to enclose a light output part of the second lamp 245 therein. The surface of the recessed part forming the second light-introducing part 236 is smooth. Thus, a light-introducing efficiency is improved. In this embodiment 2, three second lamps 245 are arranged at equal intervals along a transverse direction (a vertical direction relative to a sheet surface in FIG. 9) of the lens 230. Thus, the second light-introducing parts 236 are also formed at three positions at equal intervals. The second lamp 245 generates lights in a transverse direction (total direction of 360°) by an operation of a lens 247 provided above an LED lamp 246 of amber color.

The back surface side of the lower part of the lens 230 is formed in the shape of regular stairs toward a periphery from the second light-introducing part 236 at a center. Thus, second reflecting parts 237 and second connecting parts 238 alternately continue. The second reflecting part 237 is an area for reflecting the light from the second lamp 245 by an interface to generate lights in the direction of the front surface 231 and is formed with a surface at an angle ($\beta$ in FIG. 4) of about 30° to about 50° with respect to a central axis of the second lamp 245.

The second connecting part 238 is formed with a surface at an angle of about 90° with respect to the central axis of the second lamp 245 and does not generate a positive reflecting action in the direction of the front surface 231 differently from the second reflecting part 237.

The configuration and the angle of the second reflecting part 237 are set by considering the light distributing characteristics of the turn lamp part 220. The configurations and the angles of all the second reflecting parts 237 are not necessarily fixed. The above-described matter is also applied to the second connecting parts 238.

As described above, the back surface side is formed in the shape of the stairs. Thus, in the lower part of the lens 230, the part near the second light-introducing part 236 is the thickest (about 30 mm). As parts are more separated from the second light-introducing part 236, the parts are regularly thinner. The height of the lower part of the lens 230 is about 35 mm.

A light reflecting process is applied to the back surface side of the lens 230 except the first light-introducing part 232a, the second light-introducing part 236 and a connecting part to the housing 250. Specifically, a reflecting layer 260 is formed through the deposition process of an aluminum material. The reflecting layer 260 is formed so that the reflection efficiency is improved in the first reflecting parts 233 and the second reflecting parts 237 and the advancing directions of the reflected lights are also uniformed. Further, when the lens 230 is viewed from the front surface side thereof, the reflecting layer 260 is visually recognized to give a texture of metal.

In a boundary part of the upper part and the lower part of the lens 230, a light reflecting and diffusing area 215 is formed that continues along the transverse direction of the lens 230 (a vertical direction relative to a sheet surface in FIG. 9) (see FIG. 7 and FIG. 9). In the rear combination lamp 201, this light reflecting and diffusing area 215 functions as a barrier to the light to prevent the light from leaking to the turn lamp part 220 from the tail/stop lamp part 210 and the leakage of the light in an opposite direction thereto.

The light reflecting and diffusing area 215 is formed by a laser process and has a multi-layer structure that includes two to eight layers laminated in the vertical direction of the lens 230. Each layer is composed of an assembly of fine cracks. The thickness of the light reflecting and diffusing area 215 (a vertical length) is about 5 mm. As shown in FIG. 9, the light reflecting and diffusing area 215 is formed to a part near the surface of the lens 230. Specifically, the light reflecting and diffusing area 215 is formed by providing a distance of about 3 mm between the light reflecting and diffusing area 215 and the front surface 231 of the lens and to a position of 3 mm between the reflecting and diffusing area 216 and the back surface of the lens. In such a way, the light reflecting and diffusing area 215 that widely covers the boundary part is provided to suppress the leakage of the light to a minimum.

On the other hand, as shown in FIG. 7, in the upper part of the lens 230, a planar irregular reflection area 216 is formed in an edge part of the right side viewed from the front surface. The irregular reflection area 216 is formed by a laser process and composed of an assembly of fine cracks. The irregular reflection area 216 has a structure including one layer differently form the light reflecting and diffusing area 215 and the thickness thereof (a transverse length) is about 1 mm.

Now, a cooling mechanism in the rear combination lamp 201 will be described below. In the rear combination lamp 201, the first vent hole 251 functions as an exhaust hole and the second vent hole 252 functions as an air inlet hole. That is, a flow of air is generated from the second vent hole 252 to the first vent hole 251 in the housing 250. Thus, the first lamp 240 and the second lamp 245 are cooled. Here, since the tail/stop lamp part 210 whose frequency of use is high is arranged in the upper part, air heated by the first lamp 240 of the tail/stop lap part 210 is rapidly discharged outside from the first vent hole 251 in the vicinity of the first lamp 240. At the same time, outside air is taken in from the second vent hole 252. As a result, the housing 250 is not filled with heat so that the entire part of the device can be efficiently cooled. As described above, according to the combination lamp 201 of the present invention, an efficient cooling operation is carried out that considers the provision of the lamps whose frequencies of use are different from each other in the housing in spite of a simple structure. Further, the fins of the heat sink 243 of the first lamp 240 are formed so as to be parallel to the forward and backward direction of the lens 230 (a transverse direction relative to a sheet surface in FIG. 9). Thus, in the tall/stop lamp part 210, since the air heated by the first lamp 240 is apt to move rearward the area where the first lamp 240 is disposed and is smoothly exhausted from the first vent hole 251, the entire part of the device is efficiently cooled. As described above, since the device is entirely cooled, the thermal expansion/contraction of the lens 230 is suppressed to prevent the reflecting layer 233 from being peeled off.

Now, a lighting operation of the rear combination lamp 201 will be described. Initially, when a tail lamp display is carried out, the first lamp 240 is lighted with a low luminance in accordance with an input signal from a vehicle side. The parallel lights emitted from the first lamp are introduced to the upper part of the lens 230 through the first light-introducing part 232. The introduced lights reach the first reflecting parts 233 to receive a reflecting operation there and are converted into the lights in the direction of the front surface 231. The lights thus generated are emitted from a front surface (in FIG. 9, an area designated by reference numeral 231a) in the upper part of the lens 230.

Figure 10:
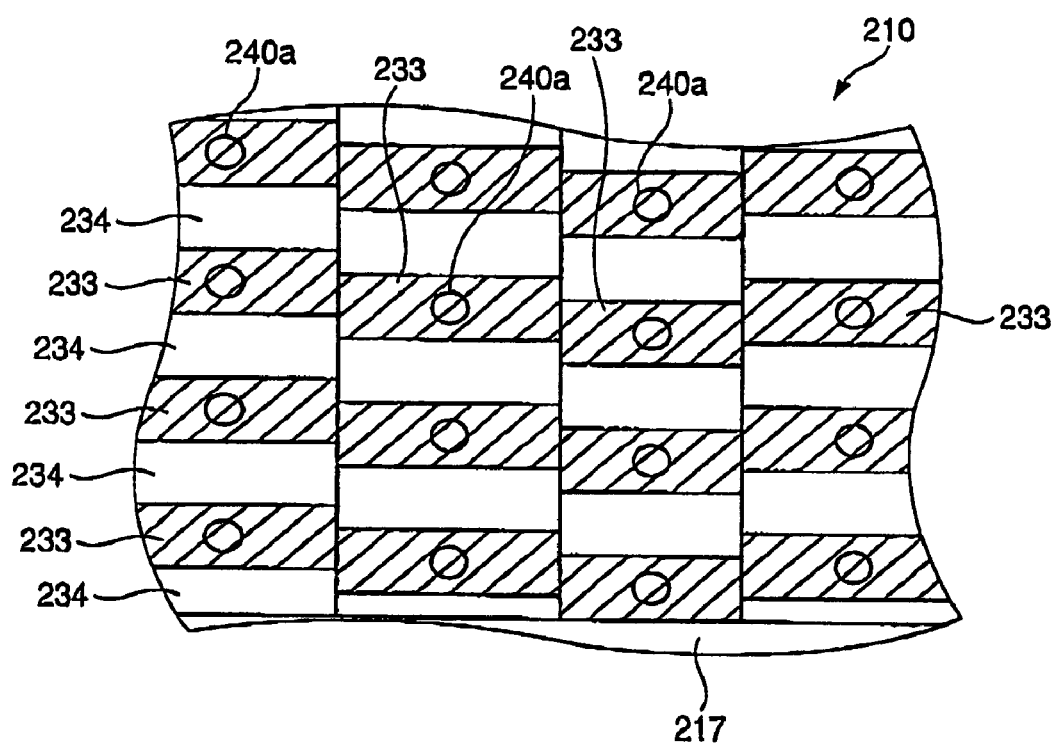
FIG. 10 is a plan view for schematically explaining a state when a tail/stop lamp part 210 emits light.

A state of the tail/stop lamp part 210 during emitting the lights is schematically shown in FIG. 10. As apparent from the drawing, areas seen to emit the lights (the first reflecting parts 233) and areas seen to emit no light (the first connecting parts 234) alternately appear. In each of the first reflecting parts 233, a mirror image 240a of the first lamp 240 can be recognized. The first reflecting part 233 forming the convex surface can function as a convex mirror to reflect a wide range. Thus, an entire mirror image of the first lamp 240 is seen in each of the first reflecting parts 233. That is, all the first reflecting parts 233 reflect a complete mirror image of the first lamp 240 to improve design characteristics.

As apparent from FIG. 10, while the first reflecting parts 233 respectively vertically deviate by a distance corresponding to a half as long as one reflecting part 233, the first reflecting parts 233 continue in the transverse direction. With such a construction, steps in the back surface side of the lens can be decreased, so that the lens can be easily molded.

Here, since the thick lens 230 is used, the lights in the direction of the front surface 231a are generated by the plurality of first reflecting parts 233 continuing through the first connecting parts 234, the front surface 231a in the upper part of the lens 230 emits the light throughout an entire part.

A quantity of light that reaches the first reflecting part 233 located at a position separate from the first lamp 240 is smaller than a quantity of light that reaches the first reflecting part 233 located at a position near the first lamp 240. However, as can be understood from the above description, in the first reflecting part 233 located at the position separate from the first lamp 240, a distance from the front surface 231a is short. Thus, the reflected light generated there is efficiently emitted from the front surface 231a. In such a way, since the decrease of the quantity of light resulting from the distance from the first lamp 240 is cancelled by the increase of a light utilization factor, the luminance of the light emitted from the front surface 231a is made to be uniform. Further, since all the reflecting parts 233 are irradiated with the light from the first lamp 240, the luminance of the emitted light is uniformed.

A part of the lights introduced to the upper part of the lens 230 advances to the lower part of the lens 230. In the rear combination lamp 201, the light reflecting and diffusing area 215 serves as the barrier to the light. That is, the light directed toward the lower part of the lens 230 is interrupted by the light reflecting and diffusing area 215. Thus, the light is prevented from leaking to the turn lamp part 220 and cut off. Namely, the boundary of a light-emitting area and a non-light-emitting area is made to be clear to obtain a display of the emitted light excellent in its design characteristics and visibility. As described above, the light reflecting and diffusing area 215 has the multi-layer structure so that a high light cut off effect is realized.

On the other hand, a part of the lights introduced to the upper part of the lens 230 reaches the irregular reflection area 216 and is irregularly reflected there. Thus, when the rear combination lamp 201 is obliquely or transversely viewed, the lights resulting from the irregular reflection area 216 (that is, a planar light emission) are observed. In such a way, the display of the emitted light of a wide angle of visibility is achieved. The irregular reflection area 216 is thinned and a position where the irregular reflection area is formed is set to an edge part of the upper part of the lens 230. Thus, the irregular reflection area 216 is prevented from outstanding when it is viewed from the front surface, and an influence to the light-introducing operation is reduced at the same time.

In the tail/stop lamp part 210, a very thick lens 230 is used as described above and the first lamp 240 is not arranged in the back surface side of the upper part of the lens (the first lamp 240 is arranged in the lower end side of the lens). Then, the lens 230 is designed so that lights of outer lights incident from the front surface 231 that directly advance to the first light-introducing part 232a are totally reflected on an interface of the first light-introducing part 232a to prevent the first lamp 240 from being externally directly observed through the lens 230. Namely, when the lens is observed from a position a or a position b in FIG. 9, the first lamp 240 is not visually recognized due to the total reflection of the front surface 231a of the lens or the first light-introducing part 232a. When the lens is observed from a position c, the reflecting layer 260 is seen, so that the existence of the first lamp 240 is not recognized as in the case where the lens is observed from the position a or the position b. Thus, this lighting device succeeds in hiding assuredly the existence of the first lamp 240 irrespective of a simple structure and represents an unpredictable quality with high design characteristics.

Figure 11:
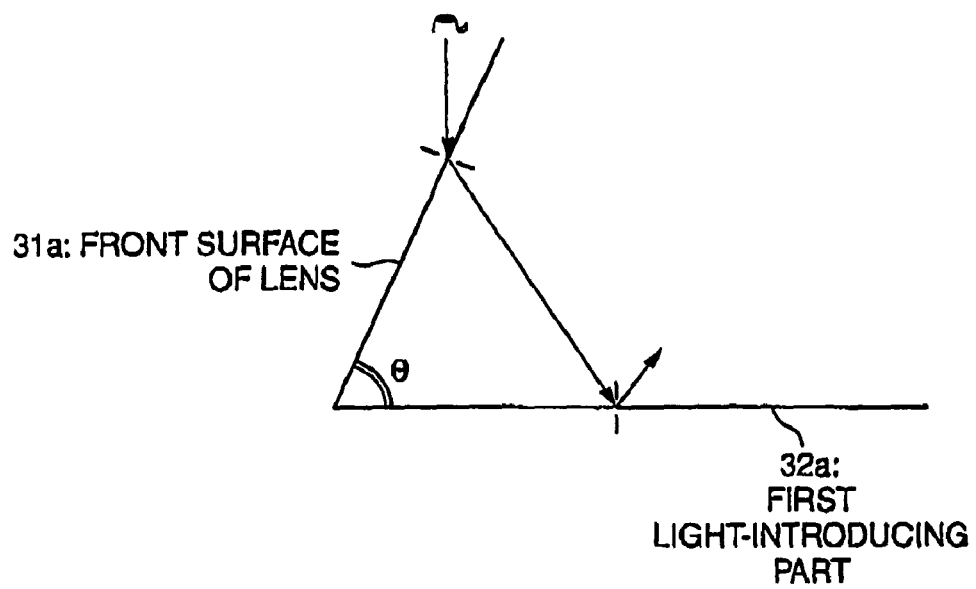
FIG. 11 is a diagram for explaining an angle formed by a front surface 231a of a lens and a first light-introducing part 232.

To generate the above-described total reflection, as shown in FIG. 11, assuming that the refractive index of the lens is n, an angle $\theta$ formed by the front surface 231a and the first light-introducing part 232a needs to satisfy a prescribed condition, that is, a below-described relational equation (when a condition is set that the first light-introducing part 232a is a plane).

$$\theta > 2\sin^{-1}(1/n) \qquad \text{[Equation 4]}$$

When the lens 230 is designed so as to satisfy the above-described condition throughout the entire part of the upper part of the lens, when a direction toward the first lamp 240 (that is, a direction of the first light-introducing part 232a) is viewed through the front surface 231 of the lens, the first lamp 240 is not seen irrespective of the position of a visual point. That is, the first lamp 240 is not directly visually recognized through the front surface 231 of the lens. In such a way, the existence of the first lamp 240 is preferably completely hidden. However, when it is considered that the range of the position of a visual point of an observer during the use of the rear combination lamp 201 is limited (for instance, during an ordinary use, the rear combination lamp 201 is not observed from the position a in FIG. 9), if a part (for instance, an upper edge part of the upper part of the lens) of the front surface 231 of the lens does not satisfy the above-described condition, a problem may not practically arise. Thus, an angle θ formed by the front surface 231 of the lens and the first light-introducing part 232a may satisfy a prescribed condition, that is, a below-described relational equation $$\theta > 2\sin^{-1}(1/n) - 10°$$ [Equation 5]

An area through which the first lamp 240 is externally directly seen may be positively formed on the front surface 231 of the lens. According to this structure, an unpredictable quality can be represented that the first lamp 240 is suddenly seen or the observed first lamp is suddenly hidden.

In order to easily generate the total reflection, the first light-introducing part 232a is preferably smoothed. When the first light-introducing part 232a is smoothed, the lights from the first lamp 240 can be efficiently taken in to the lens 230 and the advancing directions of the taken lights can be set. In such a way, the first light-introducing part 232a is preferably smoothed in view of a light utilization factor and a light distribution control.

In this embodiment, since the first light-introducing part 232a is a plane, the good distribution of the lights taken in to the lens 230 is realized. The configuration of the first light-introducing part 232a is not limited to the plane, and the first light-introducing part 232a can be formed by, for instance, an arbitrary curved surface. Further, the first light-introducing part 232a may be formed by combining surfaces of different configurations.

In a stop lamp display, the same lighting operation as that of the tail lamp display is carried out except that the first lamp 240 is lighted with a high luminance, and accordingly, a light emission of a high luminance is obtained from the front surface 231a.

When a turn signal display is carried out, the second lamp 245 is lighted in accordance with an input signal from the vehicle side to introduce the light of amber color to the lower part of the lens through the second light-introducing part 236 provided in the lower part of the lens. As in the case of the tail lamp display, the introduced light is converted into the light in the direction of a front surface 231b of the lens by the second reflecting part 237 so that the front surface 231b of the lower part of the lens emits light to carry out the turn signal display. Then, as in the tail lamp/stop lamp part 210, the luminance of the lights emitted from the front surface 231b of the lens is made to be uniform by the rise of a light utilization factor in an area separate from the second lamp 245. Under a state that the turn signal part 220 is lighted, similarly to the state that the tai/stop lamp part 210 is lighted, the reflecting and diffusing area 215 exhibits a good interrupting effect to prevent the leakage of the light. As a result, the light emission is obtained with high design characteristics and a high visibility.

Figure 12:
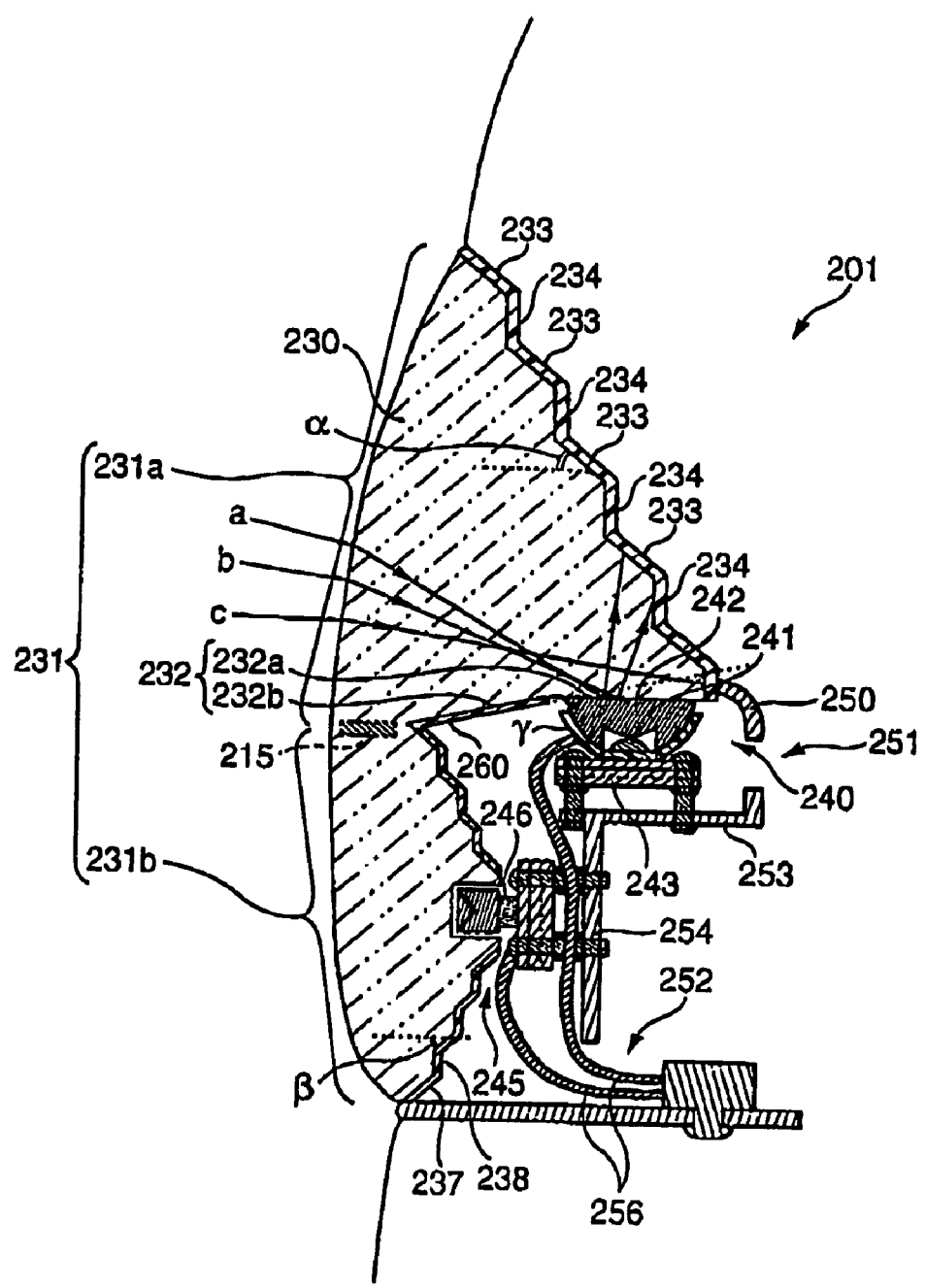
FIG. 12 is a sectional view of another embodiment of the present invention. A lens 230 is shown that includes a first introducing part 232a as an inclined surface.

In this embodiment, the first light-introducing part 232a and the non-light-introducing part 232b are formed in a parallel relation. However, as shown in FIG. 12, the first light-introducing part 232a may be formed to be inclined to the non-light-introducing part 232b. In an example shown in FIG. 12, the first light-introducing part 232a is inclined in such a direction as to decrease an angle formed by the first light-introducing part 32a and the non-light-introducing part 232b. The angle γ formed by the two surfaces is about 160°. Such a structure is effective for preventing the first lamp 240 from being directly observed through the front surface 231 of the lens. That is, the first light-introducing part 232a is inclined so that an area through which the first lamp 240 is not directly seen can be enlarged. Thus, a degree of freedom in designing the front surface 231 of the lens is improve so that the lens 230 can be thinned. Further, to incline the first light-introducing part 232a is effective for increasing the number or the area of the first reflecting parts 233. The reflecting parts are increased, which contributes to make the luminance uniform. The angle formed by the first light-introducing part 232a and the non-light-introducing part 232b is not especially limited, and for instance, 120° to 180° is preferable.

Embodiment 3

Figure 13:
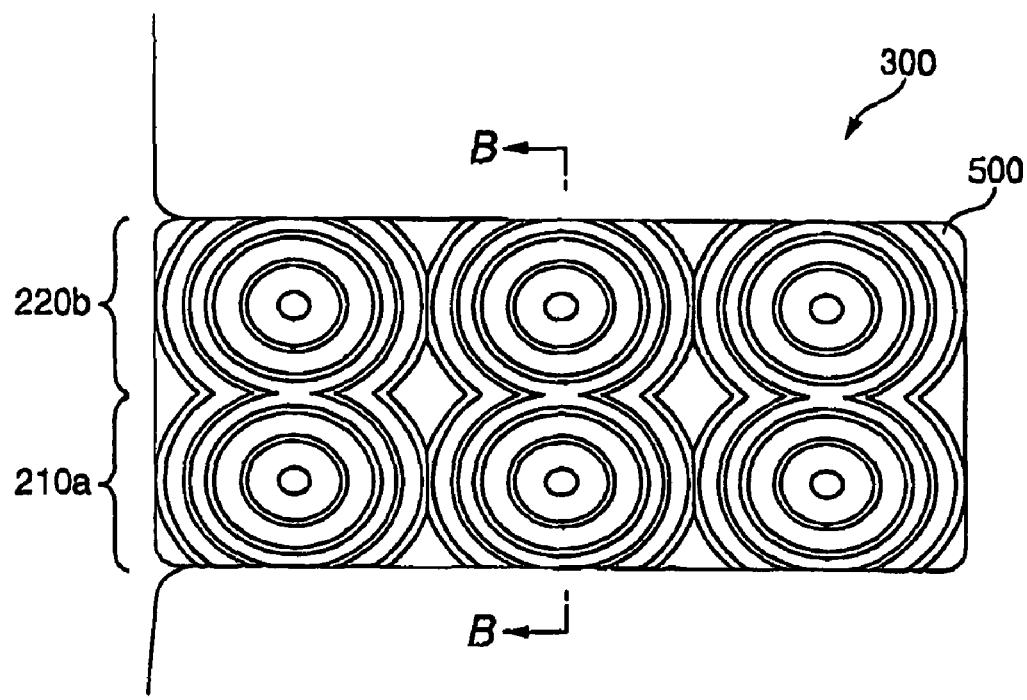
FIG. 13 is a front view of a rear combination lamp 300 of another embodiment of the present invention.
Figure 14:
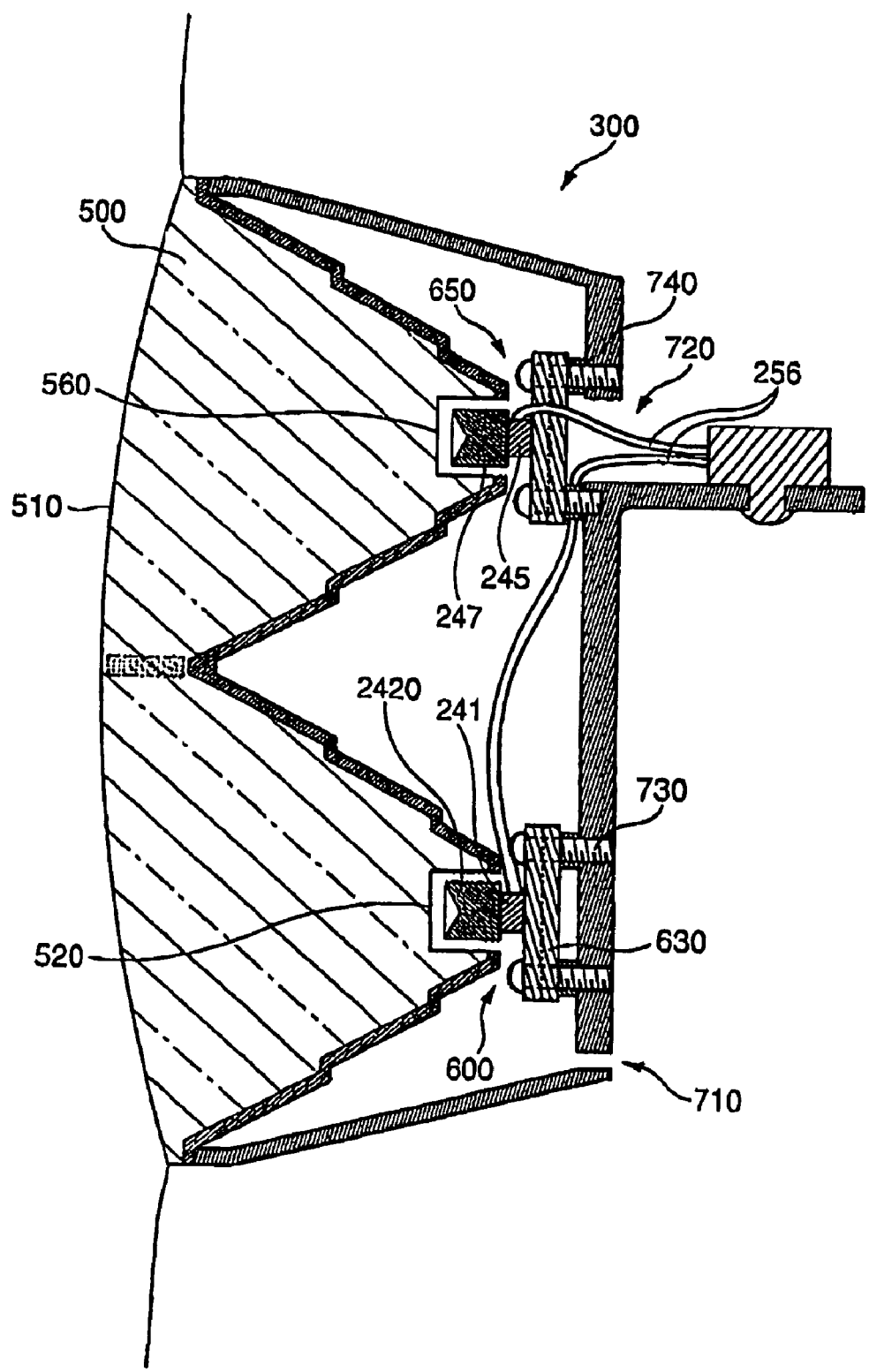
FIG. 14 is a sectional view taken along a line B-B of FIG. 14.
Figure 15:
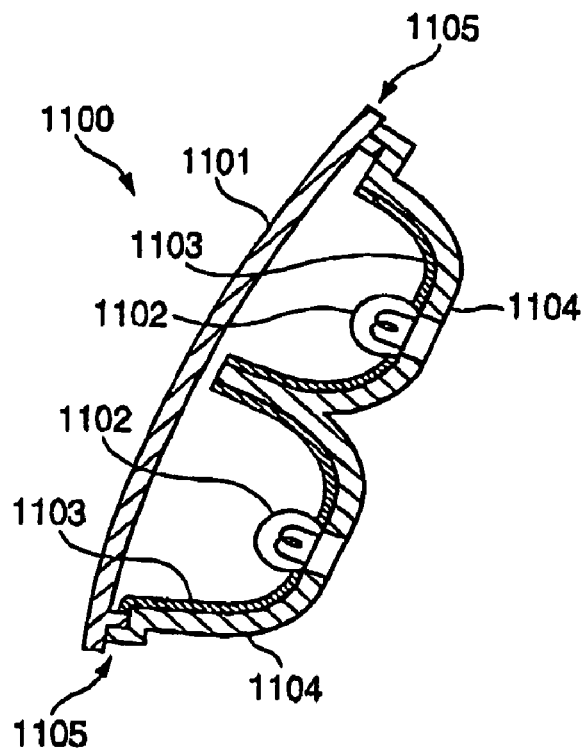
FIG. 15 is a structural example of a usual rear combination lamp.
Figure 15:
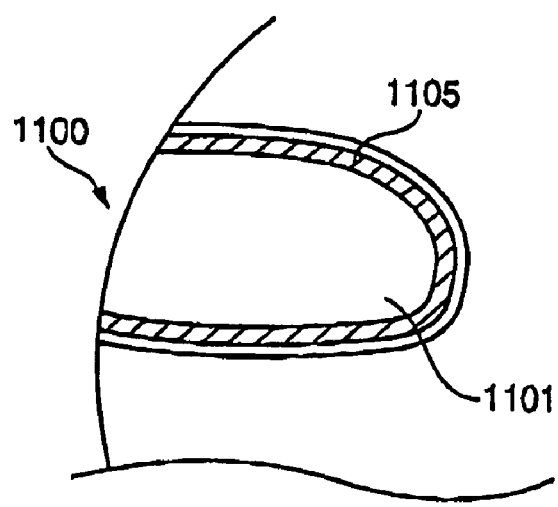

FIG. 13 shows a front view of a rear combination lamp 300 of another embodiment of the present invention. FIG. 14 is a sectional view taken along a line B-B in FIG. 13. Members the same as those of the rear combination lamp 201 are designated by the same reference numerals and an explanation thereof will be omitted.

As shown in FIG. 14, the rear combination lamp 300 is roughly classified into and includes a lens 500, two kinds of LED lamps (a first lamp 600 and a second lamp 245) and a housing 700. In the rear combination lamp 300, an outer part is directly irradiated with light emitted from the front surface 510 of the lens 500. That is, the front surface 510 of the lens 500 is a designed surface of the rear combination lamp 300. Thus, a peculiar sense of three dimensions and crystal is obtained. The rear combination lamp 300 has a structure that positively shows the first lamp 600 and the second lamp 245 in the designed surface (the front surface 510).

The housing 700 is made of a synthetic resin and includes a first vent hole 710, a second vent hole 720, a mounting part 730 of the first lamp 600 and a mounting part 740 of the second lamp 245. The housing 700 is attached to the back surface of the lens 500 by welding the edge part of the housing 700 to the edge part of the back surface side of the lens 500 through a hot plate so that a lower side 210a (a tail/stop lamp part 210a) communicates with an upper side 220a (a turn lamp part 220a) in the housing 700. The first vent hole 710 of the housing 700 is provided at a position near the first lamp 600 and below the first lamp 600 (in a lower part of a sheet surface in FIG. 14). The form of the first vent hole 710 is a slit type having a width of 3 mm and a length of 8 mm. The first vent hole is formed over a rear area where the three first lamps 600 are disposed. In the vicinity of the second lamp 245 in the housing 700, the second vent hole 720 is provided. A wire harness 256 is connected to a base plate for the first lamp 600 and a base plate for the second lamp 245 through the second vent hole 720.

In the back surface side of the lens 500, three recessed parts (first light-introducing surfaces 520) are formed at equal intervals in the lower side 210a (the tail/stop lap part 210a) to enclose respectively light output parts of the first lamps 600 therein. Three recessed parts (second light-introducing parts 560) are formed at equal intervals in the upper side 220a (the turn lamp part 220a) to enclose respectively light output parts of the second lamps 245 therein. The surfaces of the recessed parts forming the first light-introducing surface 520 and the second light-introducing part 560 are smooth. Thus, a light-introducing efficiency is improved. The first lamp 600 generates lights in a transverse direction (total direction of 360°) by an operation of a lens 620 provided above an LED lamp 241 of red color. Similarly, the second lamp 245 generates lights in a transverse direction (total direction of 360°) by an operation of a lens 247 provided above an LED lamp 246 of amber color.

The first lamp 600 is provided with a heat sink 630 including rib shaped fins. The heat sink 630 is made of aluminum and attached to the back surface side of the first lamp 600. The fins of the heat sink 630 are formed so as to be parallel to a vertical direction of the lens 500 (a vertical direction of a sheet surface in FIG. 14).

In the rear combination lamp 201, the fins of the heat sink 630 of the first lamp 600 are formed to be parallel to the vertical direction of the lens 500. Thus, the fins of the heat sink 630 serve as a guide for supplying outside air entering from the first vent hole 710 to the upper part from the lower part of the lens 500 (in FIG. 14, from a lower part to an upper part of the sheet surface). Thus, since the outside air entering to the housing 700 from the first vent hole 710 smoothly flows to the second vent hole 720, a cooling effect of the first lamp 600 is increased.

The present invention can be applied to rear combination lamps for various vehicles (a motor car, a bus, a truck, etc.).

The present invention is not limited to the explanation of the above-described embodiment of the present invention and various kinds of modified embodiments (For instant, combining each of embodiments 1, 2 and 3 to each other) are included in the present invention within a range that can be easily considered by a person with ordinary skill in the art without departing from the description of claims.

What is claimed is:

1. A lighting device for a vehicle, comprising:
    a light source;
    a light guide member, including:
        a light-introducing part provided in a back surface side of the light guide member and through which a light of the light source is introduced so as to emit the light from a front surface side of the light guide member;
        a part near the light-introducing part having a thickness which is greater than a thickness of an edge of the light guide member, the edge being disposed at a distal portion of the light guide member relative to the light-introducing part; and
        a plurality of reflecting parts and a plurality of connecting parts being alternately formed contiguously on the back surface side extending in a direction from the light-introducing part to the edge, said reflecting parts respectively reflecting the introduced light in a direction of the front surface of the light guide member; and
    a housing, connected to the back surface of the light guide member at a position between the edge of the back surface of the light guide member and the light-introducing part and attached to the back surface side of the light guide member to house the light source,
    wherein the light source comprises a first lamp and a second lamp,
    wherein the lighting device further comprises a tail/stop lamp part that emits a light of the first lamp, and a turn lamp part that emits a light of the second lamp and is provided in a lower part of the tail/stop lamp part,
    wherein the housing houses the first lamp and the second lamp,
    wherein the tail/stop lamp part communicates with the turn lamp part in the housing, and
    wherein the housing includes a first vent hole in a vicinity of the first lamp and a second vent hole in a vicinity of the second lamp.

2. The lighting device for a vehicle according to claim 1, wherein the housing is attached to the back surface side of the light guide member by a connecting part of the plurality of connecting parts.

3. The lighting device for a vehicle according to claim 2, wherein the connecting part of the plurality of connecting parts comprises a rib shaped protruding part.

4. The lighting device for a vehicle according to claim 2, wherein the connecting part of the plurality of connecting parts is provided in a vicinity of the light-introducing part.

5. The lighting device for a vehicle according to claim 2, wherein the plurality of reflecting parts and the plurality of connecting parts are formed in an alternating order of the connecting parts and the reflecting parts in the direction separate from the light-introducing part, and
    wherein the housing is connected to a connecting part of the plurality of connecting parts that is continuous to the light-introducing part.

6. The lighting device for a vehicle according to claim 1, wherein the plurality of reflecting parts and the plurality of connecting parts are formed from the light-introducing part to the edge of the light guide member.

7. The lighting device for a vehicle according to claim 1, wherein a layer comprising a light reflecting material is disposed on a surface of the reflecting part.

8. The lighting device for a vehicle according to claim 1, wherein a layer comprising a light reflecting material is disposed on the back surface of the light guide member except the light-introducing part and a connecting part of the plurality of connecting parts to which the housing is connected.

9. The lighting device for a vehicle according to claim 1, wherein the light source comprises an LED lamp.

10. The lighting device for a vehicle according to claim 1, wherein the tail/stop lamp part is provided with the light guide member, and
    wherein a thickness of the light guide member at an end of the light guide member is less than a thickness of a lower end of the light guide member, in both a continuous and a stepwise thickness.

11. The lighting device for a vehicle according to claim 1, wherein a light of an outer source incident on the light guide member through the front surface of the light guide member that directly advances to a lower end of the light guide member is totally reflected on an interface of the lower end.

12. The lighting device for a vehicle according to claim 10, wherein the first lamp is arranged such that a light-emitting side thereof is opposed to the lower surface of the light guide member, the first lamp including a heat sink comprising a plurality of rib shaped fins and the fins being parallel to a forward direction of the light guide member and a backward direction of the light guide member.

13. The lighting device for a vehicle according to claim 1, wherein the first lamp and the second lamp comprise a plurality of LED lamps.

14. The lighting device for a vehicle according to claim 1, wherein a light of an outer source incident on the light guide member through the front surface of the light guide member that directly advances to the light-introducing part of the light guide member is totally reflected on an interface of the light-introducing part of the light guide member, such that the lamp is other than directly observed from the front surface of the light guide.

15. The lighting device for a vehicle according to claim 1, wherein the position on which the housing connects to the light guide member protrudes outward from a remainder of the back surface of the light guide member in a direction away from the front surface of the light guide member.

16. The lighting device for a vehicle according to claim 1, wherein the first vent hole is disposed at a location closer to a top of the light guide member than a location of the second vent hole.

17. The lighting device for a vehicle according to claim 16, wherein the first vent hole is disposed at a location such that, if air entering the second vent hole is heated, then the air will rise toward the location of the first vent hole.

18. The lighting device for a vehicle according to claim 1, wherein the housing is welded to the light guide member, such that the light passes through only the light guide member prior to exiting the front surface of the light guide member.

19. A lighting device for a vehicle, comprising:

a light source;

a light guide member, including:

a light-introducing part provided in a back surface side of the light guide member and through which a light of the light source is introduced so as to emit the light from a front surface side of the light guide member;

a part near the light-introducing part being thicker than an edge of the light guide member, the edge part being disposed at a distal portion of the light guide member relative to the light-introducing part; and a plurality of reflecting parts and a plurality of connecting parts alternately formed contiguously on the back surface side extending in a direction from the light-introducing part to the edge, said reflecting parts respectively reflecting the introduced light in a direction of the front surface of the light guide member; and a housing connected to a back surface of the light guide member at a position between the edge of the back surface of the light guide member and the light-introducing part, where the light source is disposed between the housing and the light guide member, wherein the light source comprises a first lamp and a second lamp, wherein the lighting device further comprises a tail/stop lamp part that emits a light of the first lamp, and a turn lamp part that emits a light of the second lamp and is provided in a lower part of the tail/stop lamp part, wherein the housing houses the first lamp and the second lamp, wherein the tail/stop communicates with the turn lamp art in the housing, and wherein the housing includes a first vent hole in a vicinity of the first lamp and a second vent hole in a vicinity of the second lamp.

* * * * *